US011238747B2

(12) United States Patent
Trujillo et al.

(10) Patent No.: US 11,238,747 B2
(45) Date of Patent: Feb. 1, 2022

(54) ON-DEMAND LEARNING SYSTEM

(71) Applicant: Accenture Global Services Limited, Dublin (IE)

(72) Inventors: Gordon A. Trujillo, Brighton, CO (US); Samir Desai, Rolling Meadows, IL (US); Bhaskar Ghosh, Bangalore (IN); Sanjeev Vohra, Bangalore (IN); Jayant Swamy, Bangalore (IN); Rahul Varma, Frankel Estate (SG); Vijay Srinivas, Bangalore (IN); Ellyn Shook, Eden Prairie, MN (US); Manoharan Ramasamy, Bangalore (IN)

(73) Assignee: ACCENTURE GLOBAL SERVICES LIMITED, Dublin (IE)

( * ) Notice: Subject to any disclaimer, the term of this patent is extended or adjusted under 35 U.S.C. 154(b) by 176 days.

(21) Appl. No.: 16/408,438

(22) Filed: May 9, 2019

(65) Prior Publication Data

US 2019/0266907 A1 Aug. 29, 2019

Related U.S. Application Data

(63) Continuation of application No. 14/838,158, filed on Aug. 27, 2015, now Pat. No. 10,297,163.

(30) Foreign Application Priority Data

Aug. 29, 2014 (IN) .......................... 4234/CHE/2014

(51) Int. Cl.
*G09B 5/02* (2006.01)
*G06F 16/44* (2019.01)

(52) U.S. Cl.
CPC .............. *G09B 5/02* (2013.01); *G06F 16/44* (2019.01)

(58) Field of Classification Search
CPC ......... G06F 17/30554; G06F 17/30867; G06F 17/30864; G06F 17/30528; G06F 17/30696; G09B 5/02
USPC ......................................................... 707/722
See application file for complete search history.

(56) References Cited

U.S. PATENT DOCUMENTS

| 8,135,801 | B2 * | 3/2012 | Harper .................... H04L 67/14 |
| 2003/0055800 | A1 | 3/2003 | Geoghegan |
| 2003/0217121 | A1 | 11/2003 | Willis |
| 2007/0208751 | A1 * | 9/2007 | Cowan .................... G06Q 10/10 |
| 2007/0271234 | A1 * | 11/2007 | Ravikiran ........... G06F 16/2471 |

(Continued)

OTHER PUBLICATIONS

Australian Patent Office, First Examination Report from Australian counterpart Patent Application No. 2015218554 dated May 18, 2016, 5 pages.

(Continued)

*Primary Examiner* — Hosain T Alam
*Assistant Examiner* — Nicholas E Allen
(74) *Attorney, Agent, or Firm* — Crowell & Moring LLP

(57) ABSTRACT

An on-demand learning system provides an enhanced leaning environment capable of delivering relevant content on virtually any topic to specific learners. The learning system implements technical features that facilitate curation and subject matter validation of many different types of content. The technical architecture of the learning system also supports intelligent matching of learners to subject matter areas, creation of specific subject matter boards, and resilient maintenance of the boards.

20 Claims, 13 Drawing Sheets

(56) References Cited

U.S. PATENT DOCUMENTS

| | | | | |
|---|---|---|---|---|
| 2008/0209393 | A1* | 8/2008 | Evensen | G06F 8/43 717/108 |
| 2009/0029644 | A1* | 1/2009 | Sue | H04N 21/2547 455/3.02 |
| 2009/0035733 | A1* | 2/2009 | Meitar | G09B 7/00 434/118 |
| 2009/0106253 | A1* | 4/2009 | Fischer | G06F 16/954 |
| 2010/0075288 | A1* | 3/2010 | Sareday | G06F 16/838 434/322 |
| 2010/0075289 | A1 | 3/2010 | Maher et al. | |
| 2010/0094679 | A1* | 4/2010 | Diehl | G06Q 10/063112 705/319 |
| 2010/0151431 | A1* | 6/2010 | Miller | G09B 5/00 434/350 |
| 2011/0029591 | A1 | 2/2011 | Wood et al. | |
| 2011/0055100 | A1* | 3/2011 | Perreault | G06Q 50/2053 705/327 |
| 2011/0066710 | A1* | 3/2011 | Paul | G06F 16/958 709/222 |
| 2012/0117484 | A1* | 5/2012 | Convertino | H04L 67/22 715/744 |
| 2012/0284738 | A1* | 11/2012 | Narasimhan | H04N 21/25891 725/16 |
| 2013/0040277 | A1* | 2/2013 | Linton | G06Q 10/101 434/350 |
| 2013/0067303 | A1* | 3/2013 | Kantor | G06F 16/176 715/205 |
| 2013/0111005 | A1* | 5/2013 | Chu | G06N 7/005 709/224 |
| 2013/0124972 | A1* | 5/2013 | Le Chevalier | G06F 21/121 715/234 |
| 2013/0238649 | A1* | 9/2013 | Shum | G06F 16/211 707/758 |
| 2013/0265592 | A1* | 10/2013 | Bellagamba | G06Q 30/0276 358/1.6 |
| 2013/0266924 | A1* | 10/2013 | Zelin | G09B 7/00 434/362 |
| 2013/0309645 | A1* | 11/2013 | Billinge | G09B 7/00 434/350 |
| 2013/0325665 | A1* | 12/2013 | Shaffer | G06Q 50/20 705/26.61 |
| 2013/0325870 | A1* | 12/2013 | Rouse | G06F 16/353 707/741 |
| 2014/0024009 | A1* | 1/2014 | Nealon | G09B 5/12 434/362 |
| 2014/0052659 | A1* | 2/2014 | Karandikar | G09B 5/06 705/326 |
| 2014/0057239 | A1* | 2/2014 | Vehovsky | G09B 5/06 434/322 |
| 2014/0067703 | A1* | 3/2014 | Baeck | G06Q 10/1053 705/321 |
| 2014/0082645 | A1* | 3/2014 | Stern | H04N 21/44222 725/13 |
| 2014/0089472 | A1* | 3/2014 | Tessler | H04L 67/22 709/219 |
| 2014/0101523 | A1* | 4/2014 | Bar-Nahum | G06F 40/10 715/201 |
| 2014/0101531 | A1 | 4/2014 | Capt et al. | |
| 2014/0120516 | A1* | 5/2014 | Chiang | G09B 5/02 434/362 |
| 2014/0122404 | A1* | 5/2014 | Champion | G09B 7/02 706/46 |
| 2014/0122595 | A1* | 5/2014 | Murdoch | C03C 21/002 709/204 |
| 2014/0147824 | A1* | 5/2014 | Kumar T | G09B 5/00 434/350 |
| 2014/0181864 | A1 | 6/2014 | Marshall et al. | |
| 2014/0220540 | A1* | 8/2014 | Burgin | G09B 7/07 434/362 |
| 2014/0222732 | A1* | 8/2014 | Stivoric | A61B 5/6802 706/12 |
| 2019/0266907 | A1* | 8/2019 | Trujillo | G09B 5/02 |

OTHER PUBLICATIONS

Australian Patent Office, Second Examination Report from Australian counterpart Patent Application No. 2015218554 dated Sep. 29, 2016, 4 pages.

Australian Patent Office, Third Examination Report from Australian counterpart Patent Application No. 2015218554 dated Apr. 13, 2017, 3 pages.

Australia Patent Office, Australia Examination Report No. 1 for Australia Patent Application No. 2017202847 dated Jan. 4, 2018, pp. 1-5.

Examination Report No. 2 in Australian Application No. 2017202847, dated Jul. 25, 2018, pp. 1-6, Offices of IP Australia, Woden ACT, Australia.

Examination Report No. 1 issued in Australian Patent Application 2019200006 dated Feb. 4, 2020, 6 pages.

* cited by examiner

ON-DEMAND LEARNING SYSTEM

RELATED APPLICATIONS

The present patent document is a continuation of U.S. patent application Ser. No. 14/838,158, filed Aug. 27, 2015, which claims the benefit of priority to India provisional Patent Application No. 4234/CHE/2014, filed in the Indian Patent Office on Aug. 29, 2014, and titled "On-Demand Learning System," the contents of which are incorporated herein by reference in their entirety.

TECHNICAL FIELD

This disclosure relates to a system architecture that provides on-demand learning.

BACKGROUND

Rapid advances in computer and communication technologies have resulted in data networks that reach virtually every part of the planet. These technologies support unparalleled access to enormous and disparate repositories of information taking many different forms that provide a raw resource for learners who desire to educate themselves on nearly any topic. Technical improvements in system architectures will facilitate finding and validating relevant information, as well as matching the information to specific learners.

DETAILED DESCRIPTION

Figure 1:
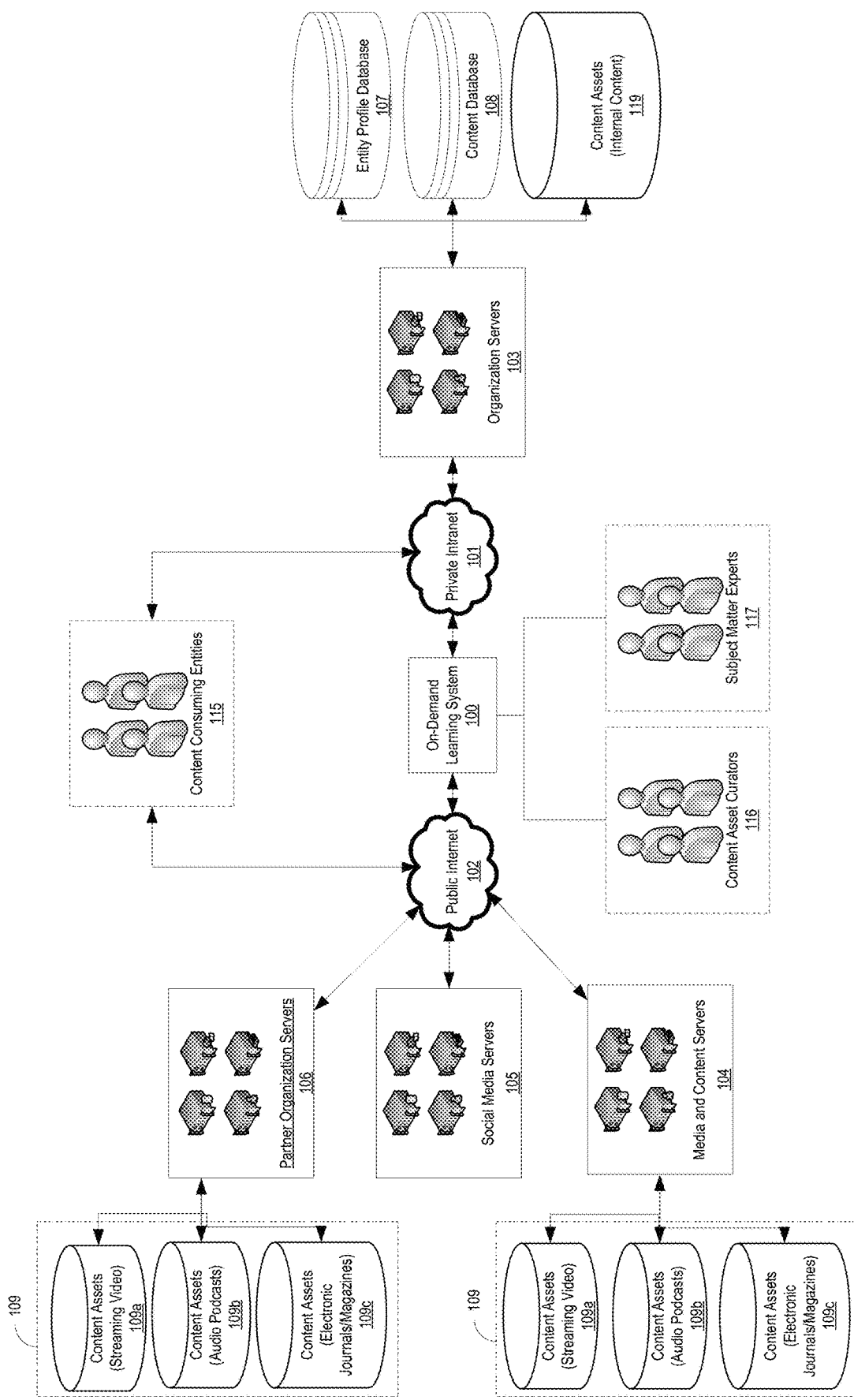
FIG. 1 illustrates a high level view of the environment in which the on-demand learning system operates.

The on-demand learning system described below helps shape vast islands of available information into an overall landscape that better serves clients, employees, individuals, and any learner, personally and professionally. The system implements learning boards that provide a view (e.g., through a thin layer aggregator) to relevant content, pointing the learner to that content without requiring cumbersome searching by the learner. The learning boards provide access to content of all types, including as examples: books, videos, publications, network web pages, audio recordings, and other types of content. The system architecture provides a connection of expert ideas, people, and substantive content in a highly visual, curated, and expert validated format, that can drive increases in knowledge and skill competency to far greater degrees than, for instance, raw searches through an Internet search engine or on a media website.

The learning system may also provide for social integration within the learning boards, for example, by gathering the experiences of peers and colleagues who have visited the same, if not similar, topics. Social integration may be further helpful in that it can promote conversation and discovery, and may lead to knowledge generation and capture. Social integration within the learning boards may provide a spring board for users and colleagues to engage in discussions relating to the learning board. Where the topic involves a new technology or a cutting edge problem, the collaboration that takes place may provide novel incites regarding the problem itself or ideas for potential solutions. The learning boards may also help to focus discussions between peers and colleagues on those points which the expert may have identified when developing the learning board. In this way, the learning system may facilitate a collaborative environment promoting the exchange of information.

In another aspect, social integration may help to shape the learning board itself. For example, a topic may be started by users and colleagues, and may organically develop in this form. An expert may then visit the topic, and if they believe the discussion is worthwhile they may choose to develop a learning board based on the conversation. Users discussing the topic may automatically be directed to view the learning board once created. The expert may choose to examine the topic on their own or the learning system may provide an indication to visit the topic. The expert may be notified, for example, once the conversation has reached a critical mass, which may be in terms of the number of comments, the number of unique commentators, social media indicators (i.e. likes, or retweets), or other similar metrics.

Social integration may also provide an expert with active feedback regarding the learning boards, which the expert may use to better curate the content that is presented. By way of example, a conversation may develop regarding a particular topic presented on the learning board. Based on the comments, the expert may be able to determine that the users of the learning board are confused about a particular topic, or perhaps have shown interest in a separate aspect of the topic. Based on these observations, the expert may, in turn, modify the learning board to introduce, modify, or remove content.

In another aspect, the learning system may support cross-platform integration, harnessing the collective knowledge of experts across multiple industries. This has the potential to provide synergistic benefits and promote inter-business relationships. While the following description discusses examples of a technical nature, the learning system is not so limited and can facilitate education on a broad range of learning topics, for example and without limitation, in the management and legal contexts, or in industry areas such as retail and consumer goods and financial services.

The description below concerns intelligently building content interfaces and content portals tailored to specific individuals. First, some example structural examples of the content portals and content interfaces are provided, along with the system that may generate the content portals and content interfaces. Then, with the headings below serving as general guideposts, the description addresses how the system may create a content interface with reference to human resources data (for example) and how the content may be filtered. The description also addresses how the content may not only be curated for selection on a content interface, but also validated by a subject matter expert.

The learning system may provide curated access to content of all types, where the content is presented in such a way so as to convey a particular view point or share a particular perspective on a topic. The learning system may do this by leveraging the knowledge and experience of those in the field. The underlying content presented in the learning system may be aggregated from external sites or contributed from within an organization. With respect to content contributed by the organization, the content may be gathered from various sources. The content, for example, may include materials specifically created for instructional or training programs and seminars. Additionally, the learning system may have the ability to parse through an internal knowledge exchange or prior work product database to identify and/or generate relevant content. The organization may also provide the learning system with access to licensed content available through partnerships with other organizations.

FIG. 1 illustrates a high-level overview of the operating environment of the on-demand learning system 100. As depicted, the learning system 100 may communicate with various networks including the private intranet 101 and the public Internet 102. The private intranet 101, for example, may represent the network infrastructure associated with the organization operating the learning system. It serves to connect the learning system 100 to the organization servers 103, allowing the learning system 100 to access data and related data services that the organization servers 103 may provide. For instance, the organization servers 103 may provide the learning system with access to an entity profile database 107 and a content database 108.

The learning system 100 may also communicate over the public Internet 102, which allows the learning system to communicate with external information sources, including the example servers and databases identified in FIG. 1. The media and content servers 104 allow the learning system 100 to access certain external audio and video content assets 109a, 109b. The learning system 100, for example, may access audio or video streams, through the public Internet 102, that are hosted on sites like Vimeo and YouTube. The external video content assets 109a can also take the form of a live audio or video broadcast, for example, a live interactive webinar. The learning system 100 may also interact with public and private servers hosting external electronically published journal, magazine, or instructional audio recording (or podcast) content assets 109c. The learning system 100 may similarly access external content assets 109a-c hosted by partner organization servers 106.

In some cases, the organization servers 103 themselves may host internal content assets 119. These internal content assets 119 may include internal content developed by the organization, for example, instructional videos, presentations, or publications. Such material, for example, may have been developed in conjunction with occupational training provided by the organization.

Furthermore, while FIG. 1 illustrates the learning system 100 in indirect communication with the organizational servers 106, it is further contemplated that the learning system 100 may operate directly with or on the organizational server 106.

Figure 2:
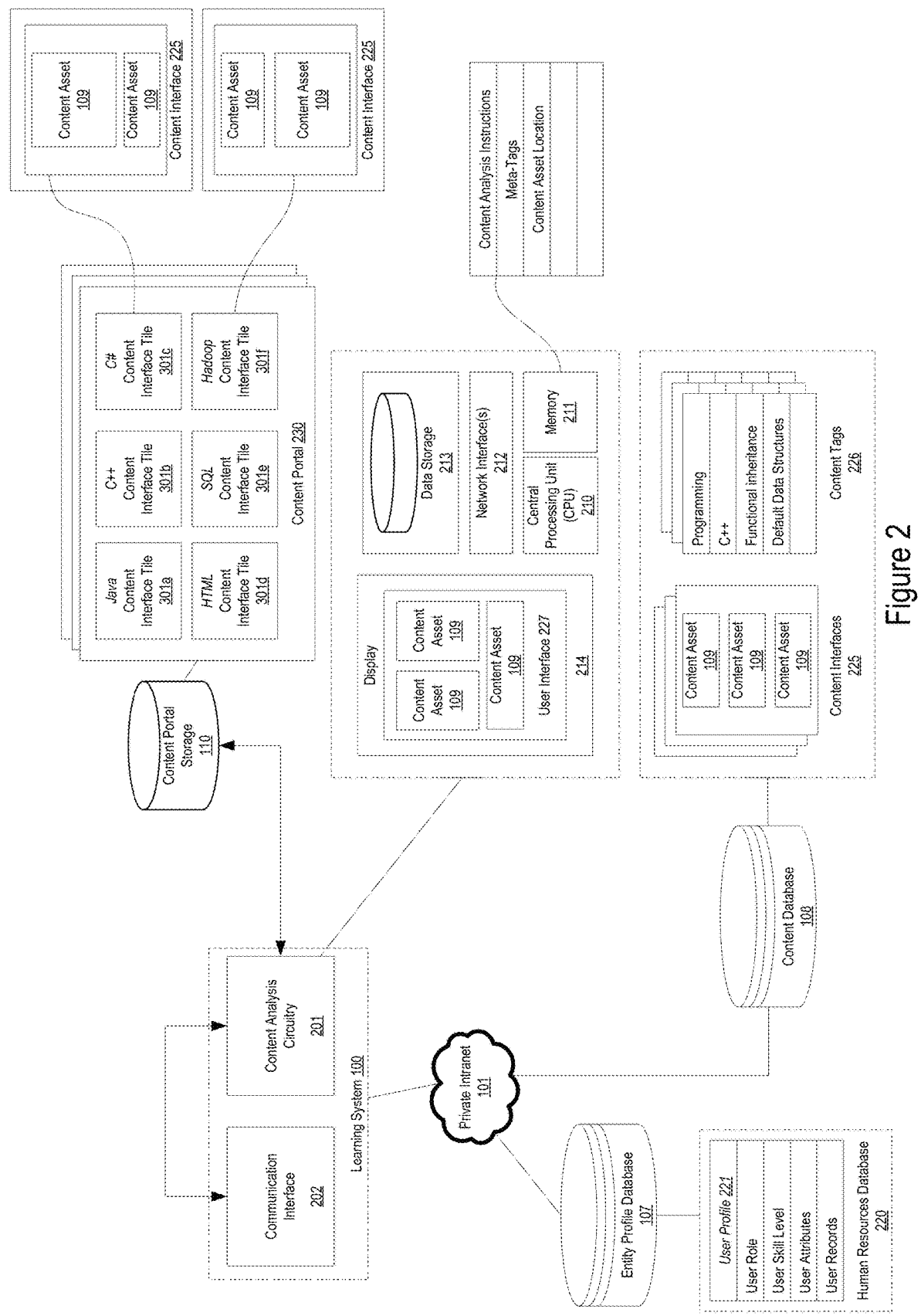
FIG. 2 illustrates a more detailed view of the on-demand learning system.

FIG. 2 illustrates additional details regarding the learning system 100. As seen in FIG. 2, the learning system 100 further comprises a communication interface 202 and content analysis circuitry 201. In one implementation, the content analysis circuitry 201 of the learning system 100 further comprises a central processing unit (CPU) 210, a memory 211, one or more network interfaces 212, and a data storage 213. The content analysis circuitry may also optionally include a display 214. The content analysis circuitry 201 may also be in communication with the content portal storage 110. The content storage portal 110, for example and without limitation, may be a part of the content analysis circuitry 201 or it may be associated with organization servers 103. The communication interface 202, under the control of the content analysis circuitry 201 is configured to communicate with the entity profile database 107 and the content database 108. The content analysis circuitry 201 may create and maintain the content portals 230 that are stored, e.g., as part of the content portal storage 110, which are delivered to the content consuming entity 115 using the communication interface 202. Any number of content portals 230 may be established for any particular user or content consuming entity 115. The content portals 230 may present the user with instructional content that is specifically curated and subject matter validated.

The entity profile database 107 contains information regarding the users or content consuming entities 115 that use the learning system 100. The learning system 100 may further access additional databases such as a human resources database 220. The human resources database 220 may be a subset of the entity profile database 107, or a separate database maintained in or by another department of the organization with which the content consuming entities 115 are associated. The human resources database 220 may include user profile data, for example, including fields that provide the user's role within the organization and the user's proficiency level with respect to a particular user skill. The human resources database 220, and correspondingly the entity profile database 107, may also contain other relevant user attributes or pertinent user records. For example, the human resources database 220 may include data related to the user's employment history, such as previous positions, roles, or jobs performed by the user. The human resources database 220 may also track information regarding the user's career objectives, including target job positions and potential growth paths, or any other characteristic that may inform educational content selection for the employee. The learning system 100, through the content analysis circuitry 201, may also be able to gather data from the entity database 107, and may use this information to adjust the appearance of the content portals 230 presented to the content consuming entities 115.

The communication interface 202 of the learning system 100 also communicates with the content database 108. The content database 108 may store internal content assets 119 or the content database 108 may store a reference to the location of a particular internal content asset 119 or external content asset 109. For example, the content database 108 may store a hyperlink or some other identification data, link, or pointer providing reference to an internal content asset 119 or external content asset 109. The identification data may direct the communication interface 202 to the location of the internal content asset 119 or external content assets 109, where the internal content asset 119 or external content asset 109, itself, may be stored remotely or locally. For example, internal content assets 119 or external content assets 109 may reside on local data storage 213 or on remote servers, for example, media and content servers 104, By identifying internal content asset 119 or external content assets 109 by reference, the communication interface 202 may be able to take advantage of other servers storing and hosting the underlying internal content assets 119 and external content assets 109. In some implementations, the communication interface 202 may act as a thin layer aggregating various internal content assets 119 and external content assets 109, directly or by reference, into a content interface 225.

The communication interface 202 also serves to aggregate internal content assets 119 and external content assets 109 or links to selected internal content assets 119 or external content assets 109 that are organized by topic or subject into specific content interface 225 resources. To that end, internal content assets 119 and external content assets 109 may be characterized by content tags 226 that identify the particular contexts in which the internal content assets 119 or external content assets 109 may be relevant. The content tags 226 may also identify particular skills or roles for which the content interface 225 may be relevant. These content tags 226 may also be stored in content database 108. In some implementations, the content interfaces 225 themselves may similarly be characterized by content tags 226 that identify the particular contexts and/or particular skills or roles for which the content interface 225 may be relevant. The content interface 225 may automatically inherit the content tags 226 of the constituent internal content assets 119 and external content assets 109, or may include additional content tags 226 that may be added through the curator input interface, as described below. The content interface 225 may also be associated with an entity or group within the organization to which the content interface 225 may be deployed. In this way, the organization may be able to monitor and track the level of engagement, for a given deployment entity, that content consuming entities 115 have with the different content interfaces 225, which may be helpful in generating reports and performing other analytics.

More broadly, the communication interface 202 acts as the gateway through which the system develops the content interfaces 225 by providing the tools to assemble, present, and deliver content in a directed fashion. The content interfaces 225 deliver the knowledge and experience of experts in the field who identify the most relevant internal content assets 119 or external content assets 109 and assemble the content assets in a focused and compelling manner.

As mentioned, the content interface 225 may be constructed as an aggregation of internal content assets 119 and external content assets 109 that are presented to the content consuming entity 115 in a purposeful way. In one aspect of its operation, the content analysis circuitry 201 generates a content interface 225 based on information stored in the content database 108. The content analysis circuitry 201 may communicate the content interface 225 to any other entity, local or remote with respect to the system, through, e.g., the public Internet 102 or private intranet 101. For instance, the content analysis circuitry 201 may direct the communication interface 202 to render and display the content interfaces 225 on display 214. While the display 214 is illustrated as part of the content analysis circuitry 201, the communication interface 202 may, additionally or alternatively, render a content interface 225 on a remote display 214 (not illustrated), for example on a personal computer or mobile device operated by the content consuming entity 115. The communication interface 202 may provide the ability to remotely view content interfaces 225 over the private intranet 101 or the public Internet 102 using the network interfaces 212 of the content analysis circuitry 201.

Figure 4:
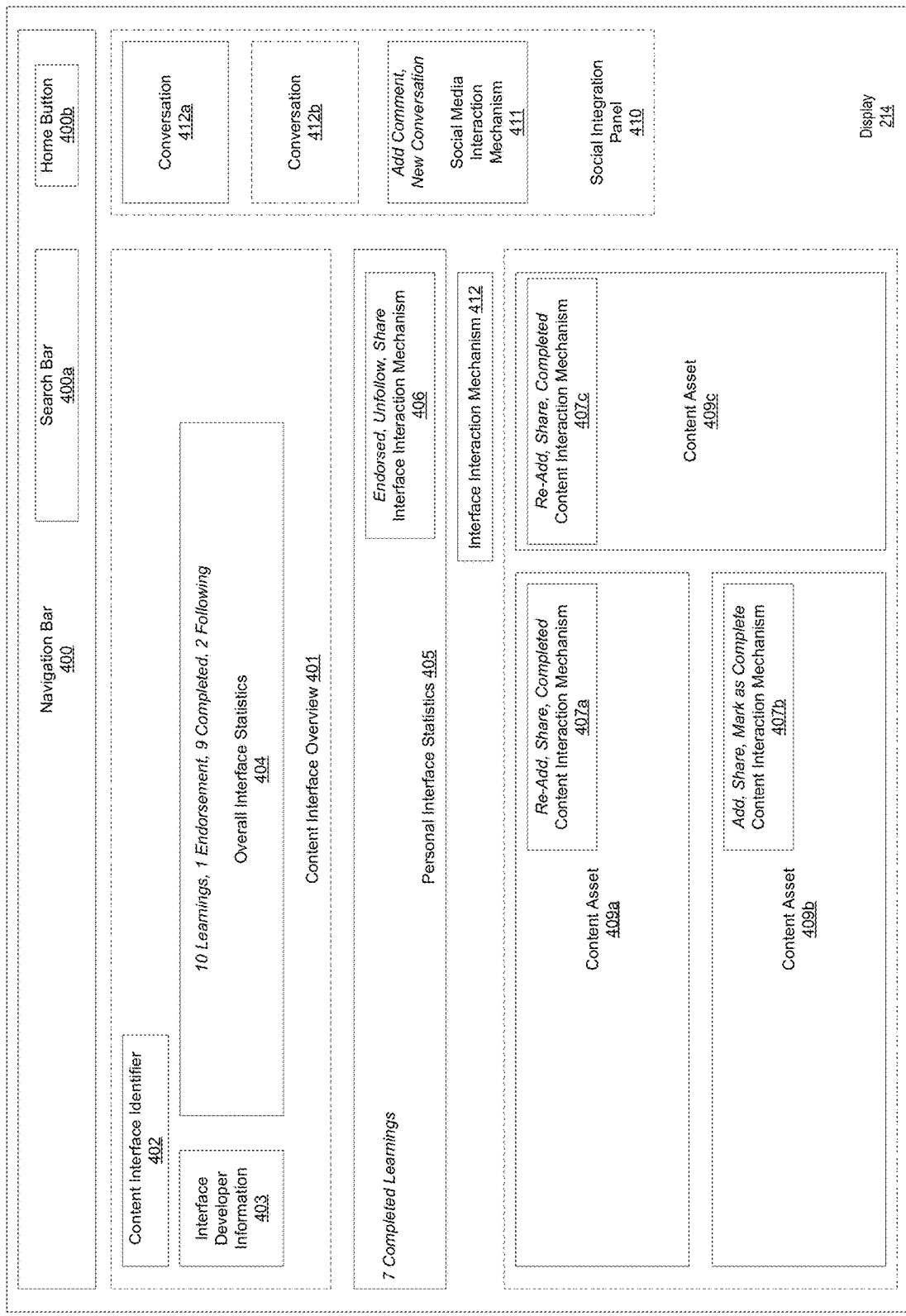
FIG. 4 depicts the integration of social medial elements within an exemplary content interface.

The assembly of a content interface 225 by the content analysis circuitry 201 will be described with reference to the learning system 100 environment of FIG. 2, and the exemplary content interface 225 rendered on display 214 illustrated in FIG. 4.

With regards to assembling a content interface 225, the communication interface 202 through the content analysis circuitry 201 may communicate with the content database 108 to retrieve the information used to create the content interface 225. For example, the content analysis circuitry 201 may retrieve information regarding the number, size, position and arrangement of individual internal content assets 119 and external content assets 109 within a content interface 225. With reference to FIG. 4, the content analysis circuitry 201 may determine that content asset 409$a$ is of certain dimensions and positioned above a similarly size content asset 409$b$ and adjacent to content asset 409$c$ of different dimensions. In the absence of a defined arrangement, the content analysis circuitry 201 may provide a default order or layout in which the internal content assets 119 and external content assets 109 are to be displayed.

The content database 108 may also store parameters or attributes regarding the manner in which the internal content assets 119 and external content assets 109 should be rendered, which the content analysis circuitry 201 may use in assembling the content interface 225. For example, for a given external video content asset 109$a$ the content database 108 may store the videos native resolution and various encoding parameters. The content analysis circuitry 201 may utilize this information to properly render and resize the content asset 409$a$ when generating the content interface 225. The content database 108 may also identify alternative versions of the same content asset 409$a$, which the content analysis circuitry 201 may utilize in generating the content interface 225. For example, the content analysis circuitry 201 may select the content asset 409$a$ most suitable, e.g., based on the quality of the content consuming entity's 115 network connection, for rendering the content interface 225 on a remote display 214.

The communication interface 202 may also present a content interface 225 with different presentation modes which may provide different internal content assets 119 and external content assets 109 or arrange the internal content assets 119 and external content assets 109 in different ways. For example, the content interface 225 may allow for the presentation of a 10 minute video—that may be identified as the default—but also include a 5 minute presentation or a 60 minute podcast as suitable alternative content assets 409$a$, allowing them to be selectively displayed by the content consuming entity 115 through a provided content interaction mechanism 407$a$. As another example, the content interface 225 may provide a mobile view, a tablet view, or a desktop view, presenting content assets 409$a$-$c$ that are suitable for the device being used by the content consuming entity 115. This may, for example, take into account what abilities the content consuming entity 115 device has, including for example its video processing capabilities or the resolution of its display 214 in. As another example, the communication interface 202 may present a content interface 225 to the content consuming entity 115 that allows the content consuming entity 115 to select between different views, for example a high-level view and a comprehensive view. In both instances, the content consuming entity 115 may automatically be presented with a view by default and may be provided with the ability to switch between views using interface interaction mechanism 412.

The content database 108 may also store relational information regarding internal content assets 119 and external content assets 109, which defines how various internal content assets 119 and external content assets 109 interact with one another and how various internal content assets 119 and external content assets 109 interface with the user. The content analysis circuitry 201 may use this relational information in generating content interfaces 225 that better engage the user. For example, the communication interface 202, under the control of the content analysis circuitry 201, may generate and render for display 214 a content interface 225 that includes a video content asset 409a, for example a lecturer giving a presentation. The content interface 225 generated by the content analysis circuitry 201 may also include a slide deck content asset 409b and an expert comments content asset 409c, which itself may be audio, video, or text, that is placed alongside the video content asset 409a.

The content analysis circuitry 201, may also generate content interfaces 225 that allow for dynamic interaction between the internal content assets 119 and external content assets 109. The content database 108 may, for instance, contain coordination and event information, which the content analysis circuitry 201 may use in generating the content interface 225. Continuing with the previous example, the content interface 225 may control the playback of the video content asset 409a, and at pre-defined positions pause the video content asset 409a. This, in turn, may trigger an action regarding the expert comments content asset 409c, for example the content interface 225 may begin playing an audio segment recorded by a subject expert that comments on or clarifies a point that was being discussed, or introduces or frames the discussion for a point that is going to be discussed in the video content asset 409a. The content database 108 may also provide the content analysis circuitry 201 with interaction information between video content asset 409a and slide deck content asset 409b. For example, the slides of slide deck content asset 409b may be coordinated to automatically change as the video content asset 409a progresses. The slides may also provide an interactive component, where the video content asset 409a is paused, and the slides in slide deck content asset 409b are advanced while being narrated by expert comments content asset 409c.

The content database 108 may also record and store information regarding the association of content interfaces 225 to content consuming entities 115. For example, a content interface 225 generated by the communication interface 202 may allow for a content consuming entity 115 to "follow" the content interface by utilizing interface interaction mechanism 412. The content analysis circuitry 201 may record this information in the content database 108. As another example, a content consuming entity 115 may "endorse" the content interface 225 by utilizing interface interaction mechanism 412, which may also be recorded in content database 108.

The content analysis circuitry 201 may use this association information in assembling the content interface 225. In the situation where a user has endorsed or is following the content interface 225, the content interface 225 may present the option to remove the endorsement or "un-follow" the content interface 225 through the use of interface interaction mechanism 412. The content analysis circuitry 201 may also use this association information to determine additional metrics or information, which the communication interface 202 may present in the content interface 225. For example, the content analysis circuitry 201 may be able to determine aggregate statistics across all content consuming entities 115, such as the total number of users that are "following" or have "endorsed" the content interface 225. The communication interface 202, under control of the content analysis circuitry 201 may then incorporate this information into the content interface 225. With reference to FIG. 4, the communication interface 202, through content analysis circuitry 201, may retrieve the relevant information corresponding to content interface 225 from content database 108, and may present a content interface 225 having a content interface overview 401. The content interface overview 401 section may further comprise of a content interface identifier 402 portion and an interface developer information portion 403, which may constitute the title for the content interface 225 and the thumbnail and photo of the subject matter expert 117 who curated the content interface, respectively. The content interface overview 401 may further include a section providing overall interface statistics, including the number of content consuming entities 115 who are currently following the content interface 225 and the number of content consuming entities 115 who have endorsed the content interface 225.

The communication interface 202 along with the content analysis circuitry 201 may also record information and track statistics regarding the content consuming entity's 115 interaction with a content interface 225, which may be stored in content database 108, For example, the communication interface 202 may record which internal content assets 119 and external content assets 109 the user has viewed or interacted with. In some instances, the communication interface 202 may more granularly track the interaction between the content consuming entity 115 and the content interface 225. For example, the communication interface 202 may record when the user began interacting with the content asset 409a-c, how long the user spent interacting with the content asset 409a-c, and whether the user has finished or completed interacting with the content asset 409a-c. As a more specific example, with reference to a video content asset 409a, the communication interface 202 may record when the user first viewed the video, when the user last viewed the video, and where the user was when last viewing the video. The communication interface 202 may also observe if the content consuming entity 115 viewed the entire video, or some minimum portion of the video, and accordingly may record in the content database 108 that the content consuming entity 115 has "completed" viewing the video content asset 409. The communication interface 202 may also generate content interfaces 225 that allow the content consuming entity 115 to manually mark or set a particular content asset 409a-c as being "complete," for example if the content consuming entity 115 had viewed the video outside of the learning system 100. Furthermore, the communication interface 202 may selectively allow the user to mark a content asset 409a-c as being complete, based on attributes of the content asset 409a-c. For example, the content database 108 may store a mandatory viewing flag associated with the content asset 409a-c, which the content analysis circuitry 201 may interpret as allowing or precluding the presentation of the option to mark as complete when generating the content interface 225.

The content analysis circuitry 201 may also use the recorded interaction information generating and assembling the content interfaces 225. For example, the content analysis circuitry 201 may determine the number of content assets 409a-c that the content consuming entity 115 has interacted with or viewed along with the total number of content assets 409a-c in the content interface 225 as a whole. The communication interface 202 may include this information, for example, in a personal interface statistics 405 section, when generating the content interface 225, thereby providing the content consuming entity 115 with information regarding the progress of the content consuming entity 115. Additionally, or alternatively, the content analysis circuitry 201 may determine those content assets 409a-c which the content consuming entity 115 has "completed" viewing or interacting with, which may include those that the content consuming entity 115 has manually marked as complete. The content analysis circuitry 201 may also determine the users overall progress as a percentage. The progress percentage may, for instance, represent the number of "completed" content assets 409a-c out of the total number of content assets 409a-c.

The content analysis circuitry 201 may also use the more granular interaction information to determine additional or more detailed progress statistics. For instance, the content analysis circuitry 201 may determine the progress of a content consuming entity 115 with respect to an individual internal content asset 119 or external content asset 109. As an example, the content analysis circuitry 201 may determine that a content consuming entity 115 viewed 15 minutes of a 30 minute video. The communication interface 202 may generate a content interface 225 that presents a progress bar to the content consuming entity 115 showing a 50% completion percentage. The content analysis circuitry 201 may also calculate the overall progress with respect to the content interface 225 as a whole, by weighting the progress of a content consuming entity 115 with respect to the internal content assets 119 and external content assets 109 in a given content interface 225. For example, the content analysis circuitry 201 may determine that in addition to viewing 15 minutes of a 30 minute video, the user has "completed" viewing two other 15 minute videos. In this context, the communication interface 202 may generate a content interface 225 that presents a progress bar to the content consuming entity 115 showing a 75% completion percentage.

The communication interface 202, utilizing the content analysis circuitry 201, may also facilitate viewing the content interface 225 in a discontinuous manner. For example, the content analysis circuitry 201 may use the recorded interaction information to determine the state of the content interface 225 when the content consuming entity 115 last viewed it. In a subsequent viewing, the communication interface 202 may generate a content interface 225 for display by the content consuming entity 115 where the internal content assets 119 and external content assets 109 are restored to their prior state. For example, the content analysis circuitry 201 may determine that a content consuming entity 115 began watching a 60 minute video content asset 409a but stopped watching the video content asset 409a after 13 minutes. As another example, where the content consuming entity 115 may have fast-forwarded through a video content asset 409a, the content analysis circuitry 201 may determine the last point at which the video content asset 409a was playing. The communication interface 202 may then present a content interface 225 where the video content asset 409a is adjusted to resume where the content consuming entity 115 had left off.

As noted earlier, the learning system 100 may also provide for social integration, allowing the content consuming entities 115 to communicate with one another, and allowing the learning system 100 to present more refined content interfaces 225. The communication interface 202 through the content analysis circuitry 201 may present a content interface 225 integrating different social media. With reference to FIG. 4, for example, the communication interface 202 may provide a content interface 225 with a social integration panel 410, which may include active conversations 412a being held by content consuming entities 115. The communication interface 202 may also provide the content interface 225 with a social media interaction mechanism 411, which may allow the user to add a comment to an existing conversation 412a or generate a new conversation 412b. The learning system 100 itself may provide this social component, but in addition, or in the alternative, the communication interface 202 through the content analysis circuitry 201 may integrate various social media platforms, like Facebook or Twitter, that may allow for dialog between content consuming entities 115.

As a general matter, the content analysis circuitry 201, may include both static and dynamic content when presenting a content interface 225. User and interface statistics, for example, may be updated at particular intervals, which may vary based on the type of information. Furthermore, the content analysis circuitry 201 may provide the communication interface 202 with a reference to the location of an internal content asset 119 or external content asset 109, which may be retrieved from a remote server for rendering. In this way, the communication interface 202 may be seen as a thin layer aggregating the various components into a content interface 225.

The content analysis circuitry 201 may also construct and maintain a content portal 230, which may be rendered on display 214. Like a content interface 225, the communication interface 202 may display the content portal 230 locally or remotely. The communication interface 202 may create a content portal 230 for a content consuming entity 115 by linking one or more content interfaces to the content portal 230 for display. The communication interface 202, through the content analysis circuitry 201, may identify one or more content interfaces 225, which are arranged to form a content portal 230. In constructing the content portal 230, the communication interface 202 may interact with the entity profile database 107, content database 108, and the internal content assets 119 and external content assets 109 themselves. The communication interface 202 may arrange the content interfaces 225 in different ways.

Building Content Portals Responsive to Entity Profiles

In one aspect of its operation for building a content portal 230 using appropriate content interfaces 225, the content analysis circuitry 201 of the learning system 100 retrieves data representing user characteristics from the entity profile database 107. The user characteristic data, for example, may constitute some or all of the user profile data 221 stored in the human resources database 220. The content analysis circuitry 201 similarly accesses and retrieves the collection of content tags 226 associated with the internal content assets 119 and external content assets 109, or content interfaces 225, stored in the content database 108. By comparing the user characteristic data with the content tags 226, the content analysis circuitry 201 is able to match the appropriate content interfaces 225 for the particular user or content consuming entity 115. For example, the content analysis circuitry 201 may compare the user role, skill and proficiency level of a content consuming entity 115 with the content tags 226 to identify a matching set of content interfaces 225 among the learning interfaces. After identifying the relevant content interfaces 225, the content analysis circuitry 201 links the matching content interfaces 225 with the content portal 230 associated with the particular user or content consuming entity 115.

Figure 3:
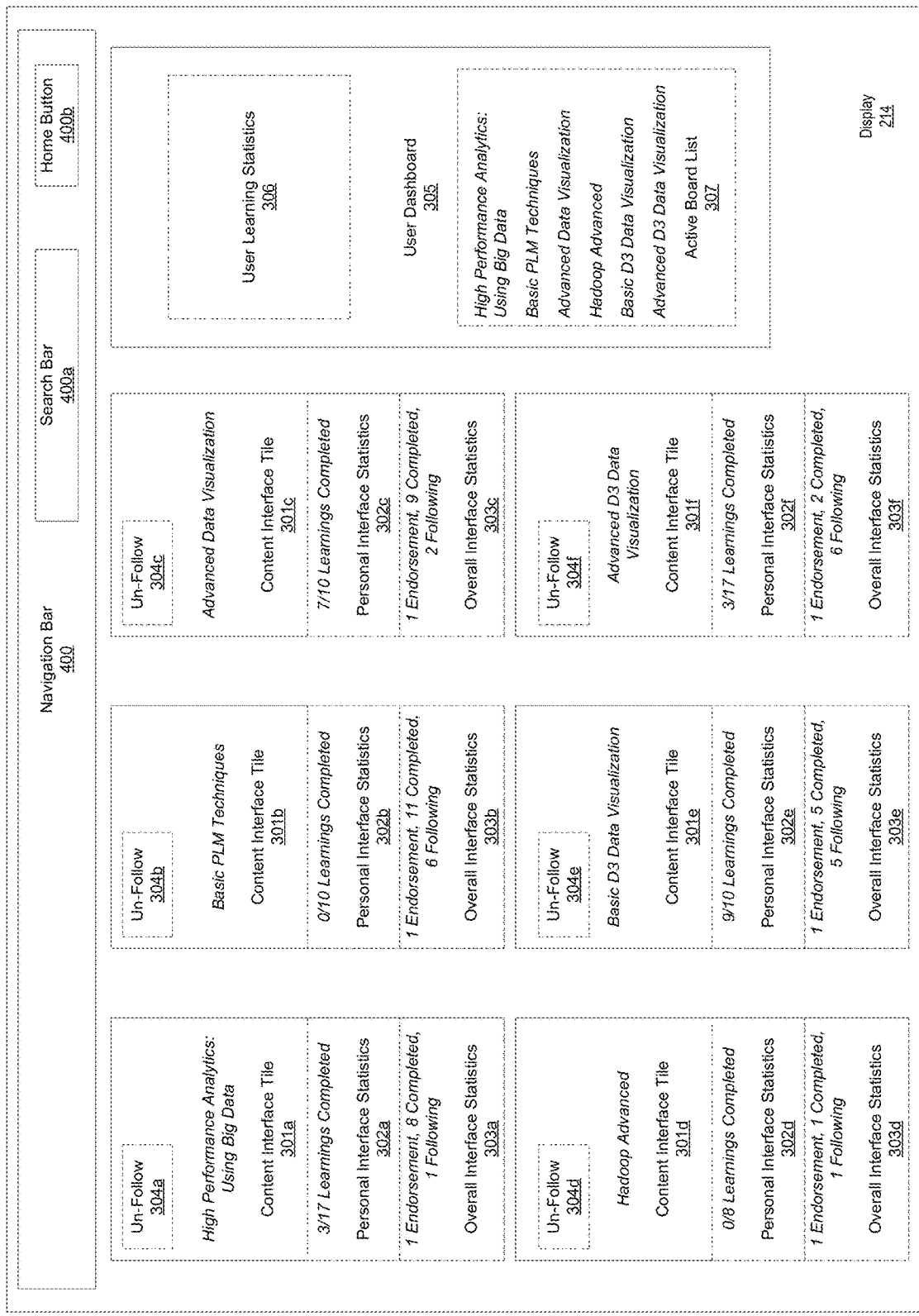
FIG. 3 depicts an exemplary content portal and its constituent content interfaces.

The assembly of an exemplary content portal 230 by the communication interface 202 will be described with reference to the learning system 100 environment of FIG. 2, and the exemplary content portal 230 rendered on display 214 illustrated in FIG. 3. The communication interface 202, under the control of the content analysis circuitry 201, may retrieve the user characteristic data of a content consuming entity 115 from the entity profile database 107. The communication interface 202 may generate a content portal 230 based on this characteristic data. With reference to FIG. 3, for example, the communication interface 202 may generate and present a content portal 230 for a content consuming entity 115 having a database programmer role with certain skills relating to data analytics, with an overall proficiency level of 6. The communication interface 202 may use this user characteristic data to identify a set of content interfaces 225 to include in a content portal 230. In determining which content interfaces 225 to include, the content analysis circuitry 201 may access and retrieve the collection of content tags 226 relating to internal content assets 119 and external content assets 109 from the content database 108. The content analysis circuitry 201 may compare the content tags 226 with the user characteristic data to identify relevant content interfaces 225. By way of example, the content analysis circuitry 201 may filter the content interfaces 225 down to those relevant for a database programmer, and further filter the results based on the content consuming entity's 115 known data analytic skills. The content analysis circuitry 201 may then identify those content interfaces relating to data analytics that are appropriate for a user having a proficiency level of 6 or greater, which may identify certain advanced data analytics topics.

Presenting Multiple Matching Content Interfaces

As described above, the content analysis circuitry 201, after identifying the relevant content interfaces 225, links the matching content interfaces 225 with the content portal 230 to be presented by the communication interface 202 on display 14 for viewing by the content consuming entity 115. In the linking process the communication interface 202, under control of the content analysis circuitry 201, generates and renders a tile or similar likeness of the content interface. With reference to FIG. 3, the content interface tiles 301*a-f* may be displayed in a common fashion being similarly dimensioned. The tile may also display information similar to that displayed in the content interface 225 itself. For example, the content interface tiles 301*a-f* may include a thumbnail photograph and content interface identifier. As illustrated in FIG. 3, the content interfaces 225 identified may include: High Performance Analytics: Using Big Data, Advanced Data Visualization, Advanced Data Visualization, Hadoop Advanced, Basic D3 Data Visualization, and Advanced D3 Data Visualization. The content interface tiles 301*a-f* may also depict overall interface statistics 303*a-f* and personal interface statistics 302*a-f* similar to the overall interface statistics 404 and personal interface statistics 405 described earlier. Because a comparison of user characteristic data and content tags 226 may match multiple content interfaces 225 to a content consuming entity 115, the communication interface 202 through the content analysis circuitry 201 may also serve to present the content interface tiles 301*a-f* in order of perceived relevance or importance. For instance, the default ordering of the content interface tiles 301*a-f* may be based on a degree of matching between the comparison of the user characteristic data retrieved from the entity profile database 107 and the content tags 226 of the internal content assets 119 and external content assets 109 contained within a content interface 225. The content database 108 may include information relating the various learning boards between one another, for example, to form a course on a particular subject. More simply, with reference to FIG. 3, Basic D3 Data Visualization may be seen as a pre-requisite to Advanced D3 Data Visualization and the corresponding content interface tiles are placed accordingly. The content interface tiles 301*a-f* may further be adjusted, in part, based on the relative popularity, for instance based on certain overall interface statistics. More specifically with reference to FIG. 3, all else being equal, content interface tile 301*b* (Basic PLM Technologies) may be deemed of greater relevance than content interface tile 301*d* (Hadoop Advanced) based on the fact that a greater number of content consuming entities 115 have "completed" the content interface and/or based on the fact that a greater number of content consuming entities 115 are "following" the course. The ordering of content interface tiles 301*a-f* may similarly be affected by the number of content consuming entities 115 who have "endorsed" the content interface 225. As another example, the ordering of content interface tiles 301*a-f* may be further influenced based on an ongoing dialogue between peers and colleagues relating to the respective content interlace 225. The content analysis circuitry 201 may perform additional analysis on the content of the social dialogue to help in the process, for example, by determining the number of subject matter experts involved in the conversation.

User Guided Content Filtering

Figure 11:
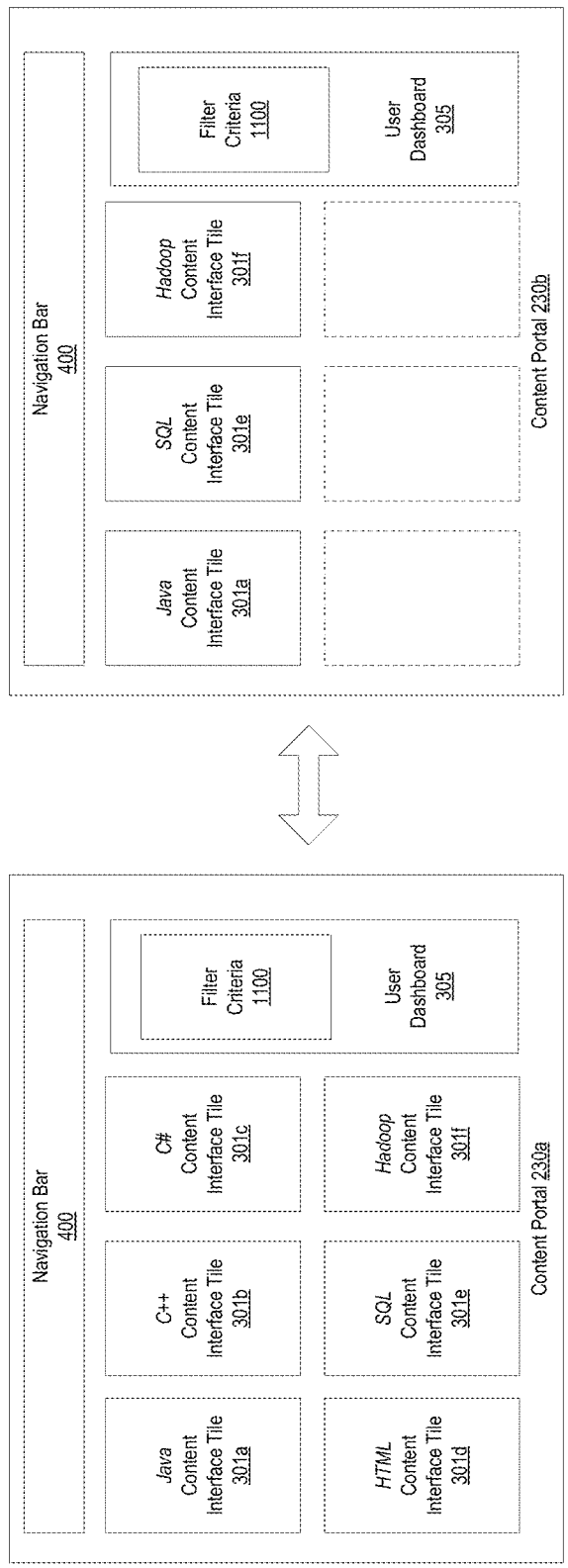
FIG. 11 depicts an exemplary content portal before and after applying filter criteria provided by the content consuming entity.

In another aspect of operation, referring to FIG. 11, the learning system 100 may include content filtering circuitry in communication with the communication interface 202, where the content filtering circuitry may be a sub-component of content analysis circuitry 201, For instance, the content filtering circuitry may include a memory storing content filtering program instructions configured for execution by the processor to accomplish the filtering functionality described below. The content filtering circuitry through the communication interface 202 may facilitate the presentation of content interfaces 225 having internal content assets 119 and/or external content assets 109 that match filter criteria 1100 identified by the content consuming entity 115.

The content analysis circuitry 201 may receive filter criteria 1100 from the content consuming entity 115, from pre-stored preferences in memory, or in other examples from other sources. As examples, the filter criteria 1100 may include a preferred media type (e.g., video, podcast, or audio stream), subject, preferred duration, resolution, content (e.g., a preferred presenter, presentation forum, or organization), type of presentation (e.g., a lecture or an interactive program) or any other filter criteria 1100 for the internal content assets 119 and external content assets 109. The communication interface 202 may receive filter criteria 1100 from the content consuming entity and provide the filter criteria 1100 to the content analysis circuitry 201. In response the content analysis circuitry 201 may determine which of the matching content interfaces 225 contain internal content assets 119 and/or external content assets 109 that meet the provided filter criteria 1100. The content filter circuitry may present the filtered matching content interfaces to the content consuming entity 115, for example, by un-linking those content interfaces 225 that did not match the provided filter criteria from the content portal 230.

Maintaining a Content Portal of a User

Figure 6:
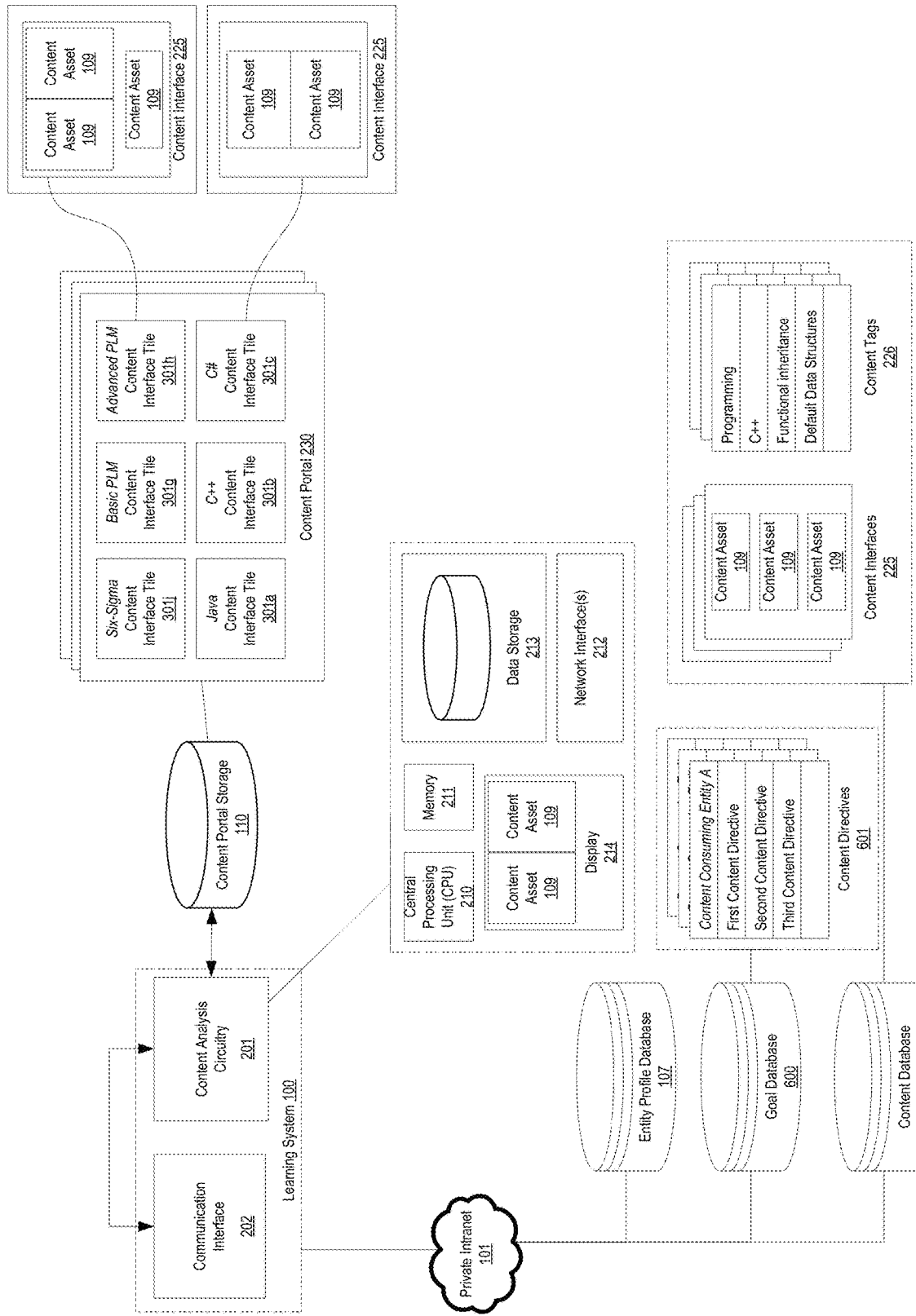
FIG. 6 illustrates a detailed view of an on-demand learning system in which content interfaces are matched based on specific goals associated with the user.

In another aspect of operation, referring now to FIG. 6, the communication interface 202, through the content analysis circuitry 201, may also order the content interface tiles 301a-j in a content portal 230 based on certain learning goals attributed with the content consuming entity 115. As another example, the communication interface 202 may order the content interface tiles 301a-j based on a learning plan, which may be optionally adopted by the content consuming entity 115. The learning plan may represent an independent interest of the user, for example where the content consuming entity 115 is casually interested in learning about how to program video games for his smartphone. The learning plan may, more broadly be intended to present a course like framework for the content consuming entity 115 maintaining an order or progression associated with the content interfaces 225 underlying the content interface tiles 301a-j. As illustrated in FIG. 6, the communication interface 202, under the control of the content analysis circuitry 201, may be configured to communicate with a goal database 600 which may include content directives 601 corresponding to a particular content consuming entity 115. The content directives 601 may, for example, represent a technical development goal or a business development goal set for the content consuming entity 115. The content analysis circuitry 201 may maintain the content portal 230 by applying the content directives 601 to order the content interface tiles 301a-j.

By way of example, the content consuming entity 115 may have the goal of becoming a project manager, which may require competency in particular non-technical skills, such as project lifecycle management or six-sigma optimization techniques. Prior to application of the content directives 601 associated with becoming a project manager, the communication interface 202 may arrange the content interface tiles 301a-j based on user characteristic data contained in entity profile database 107. Assuming that the content consuming entity's 115 competency is primary technical in nature, the communication interface 202 may present a content portal 230 having technical content interface tiles 301a-f being positioned higher up in the arrangement. For example, referring to FIG. 2, the communication interface 202 may present a content portal 230 that includes content interface tiles 301a-f relating to Java, C++, C#, HTML, SQL, and Hadoop, arranged in that order. However, after application of the content directives 601 by the content analysis circuitry 201, referring again to FIG. 6, the communication interface 202 may adjust the order of the content interface tiles 301a-j in the content portal 230 to result in the following order: Six-Sigma, Basic PLM, Advanced PLM, Java, C++ and C#. As noted above, the communication interface 202, under the control of the content analysis circuitry 201, may also serve to maintain the content portal 230 by linking or un-linking content interfaces 225 from the content portal 230. The communication interface 202 un-link an already existing and linked content interface 225 upon a determination by the content analysis circuitry 201 that the content interface 225 no longer constitutes a match for the content consuming entity 115. Such a situation may occur for example, when a user changes their role or position within the organization.

Figure 5:
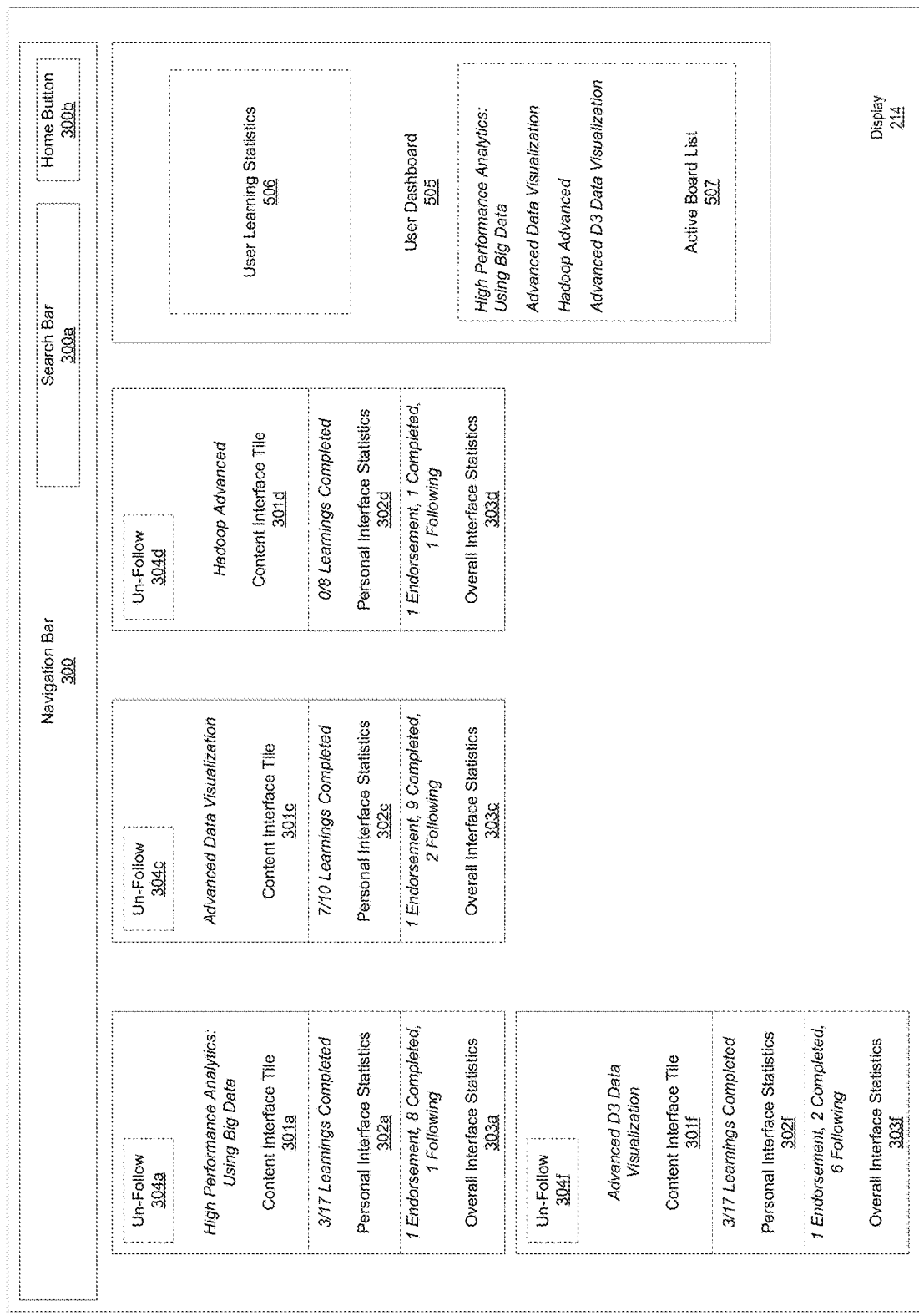
FIG. 5 depicts a content portal that was updated to reflect a change in a particular user characteristic.

The maintenance of the content portal 230 by the communication interface 202 will be described with reference to FIG. 3 and FIG. 5, where FIG. 5 illustrates the content portal 230 of FIG. 3 after undergoing maintenance. The communication interface 202 may determine that a change has been made with respect to the user characteristic data stored in entity profile database 107. The content analysis circuitry 201, in turn, may obtain a new set of matching content interfaces 225 for the content consuming entity 115, for example, by comparing the new user characteristic data against the content tags 226 contained in content database 108. With reference to FIGS. 3 and 5, the content consuming entity 115 may originally have been in a managerial position which resulted in a match to a content interface 225 relating to Basic PLM Technologies. The communication interface 202, accordingly, links the content interface 225 to the content portal 230, which presents a content interface tile 301b to be displayed on display 214. The content consuming entity 115 may subsequently be promoted to a lead technical role where project lifecycle management skills are no longer needed. Accordingly, the communication interface 202 may un-link the Basic PLM Technologies content interface 225 from the content portal 230, resulting in the removal of content interface tile 301b from display 214.

As another example, a user may "complete" a particular content interface 225, which in turn may result in a linked content interface no longer matching a content consuming entity 115. The communication interface 202 may then un-link from the content portal 230. Referring to FIG. 5, the content analysis circuitry 201 may determine that the content consuming entity 115 has completed the Basic D3 Data Visualization content interface 225. As a result, the content analysis circuitry 201 may un-link the content interface 225 from the content portal 230 and remove content interface tile 301e. Furthermore, the completion of a content interface 225 may itself have an impact on particular aspects of the user characteristic data. For example, after completing Basic D3 Data Visualization, the user's proficiency level may be adjusted. As described above, the change in user data may result in content interfaces no longer matching a content consuming entity 115.

Personalized Content Portals and Content Interface Recommendations

Figure 13:
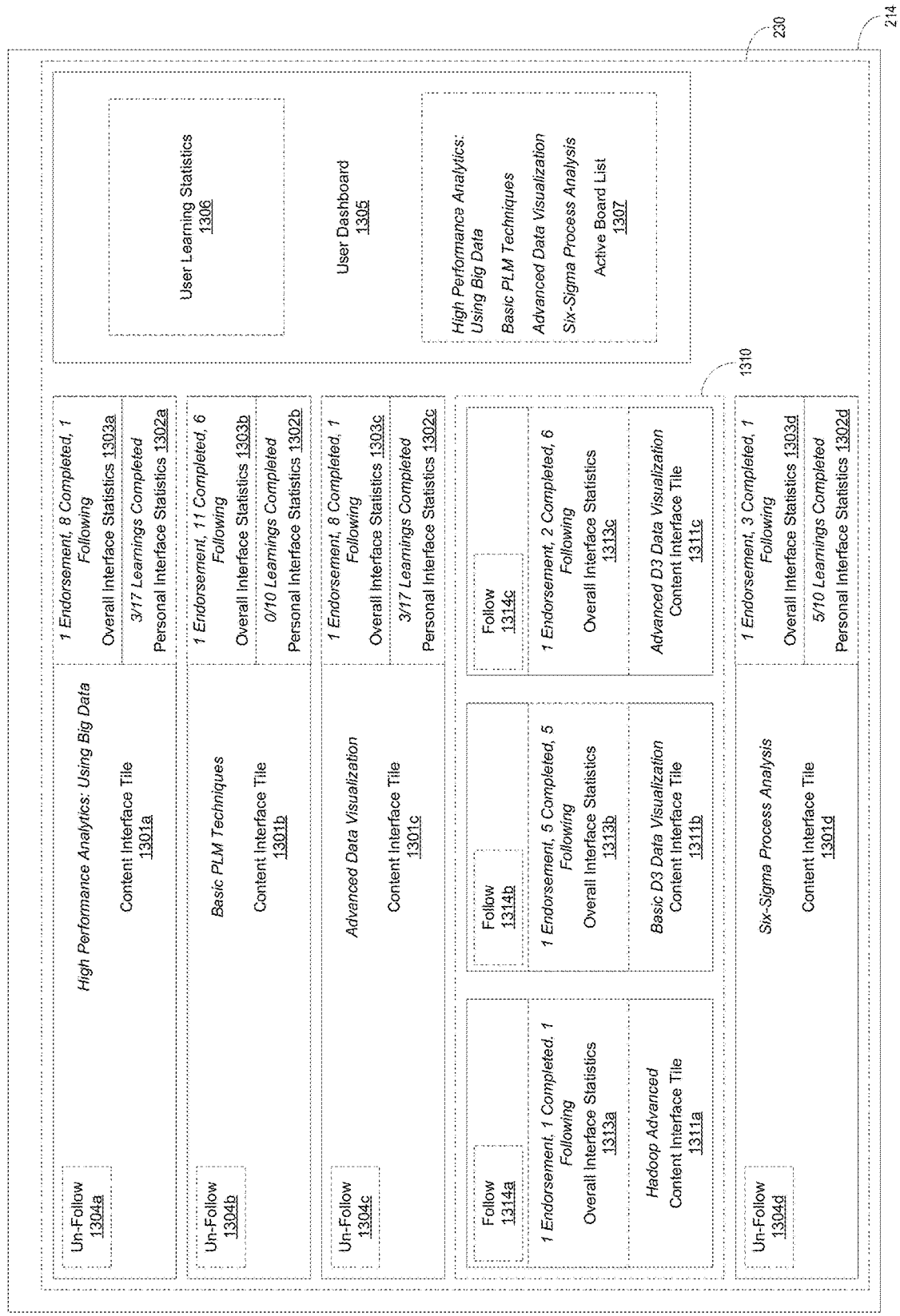
FIG. 13 depicts an exemplary content portal and its constituent content interfaces and content interface recommendations.

In another aspect of operation, described with reference to FIG. 13, the content analysis circuitry 201 of the system 100 may build a personalized content portal 230, which may be personalized to a particular content consuming entity 115. The content analysis circuitry 201 may identify those content interfaces that the content consuming entity 115 is following, and may link the content interfaces to the personalized content portal 230. In the linking process, the communication interface 202, under control of the content analysis circuitry 201, may generate and render a tile, window, or other GUI representation of the content interfaces that the content consuming entity 115 is following. As illustrated in FIG. 13, the content interface tiles 1301a-d may be displayed with a consistent presentation, e.g., having a common layout. The content interface tiles 1301a-d may display a wide array of information, including information regarding the content interface itself, overall interface statistics 1303a-d, personal interface statistics 1302a-d, such as that described earlier, or other information.

The communication interface 202 may also link to recommended content interfaces. In the linking process, the communication interface 202, under control of the content analysis circuitry 201, may generate and render a tile, window, or other GUI representation of the recommended content interfaces. The recommended content interfaces may be selected, ordered, and updated as described above, and may look at content tags 226 of the internal content assets 119 and/or external content assets 109, or content interfaces, to match appropriate content interfaces for the particular user or content consuming entity 115. The recommended content interfaces 225 may be provided in a recommendation section 1310 in the GUI, for instance. As illustrated in FIG. 13, the recommended content interface tiles 1311a-c may be displayed with a consistent presentation, e.g., having a common layout. The recommended content interface tiles 1311a-c may display a wide array of information, including information regarding the content interface itself, overall content interface statistics, and may include a GUI element to follow the recommended content interface (e.g., a "follow" button 1314a-c). The content analysis circuitry 201 may respond to selection of the follow button by designating the content interface for the associated recommended content interface tile as a content interface that the content consuming entity 115 is now following. The recommendation section 1310 may be positioned among the content interfaces that the content consuming entity 115 is already following. As illustrated, for example, the recommendation section 1310 is placed between the third and fourth content interface that the content consuming entity is following. In other implementations, the recommendation section 1310 may be positioned at the top or bottom of the content portal 230.

Content Curation and Subject Matter Expert Validation

Content building circuitry within the system 100 facilitates content curation. The content building circuitry may generate, e.g., a curated content portal 230 that provides a curator input interface into the content database. The curator input interface is configured to receive content interface building directives through the curator input interface. The directives may specify suggested content assets that compose or that are otherwise included on a content interface. Through the curator input interface, the curator may specifically select content that the curator believes is appropriate for any given topic for delivery through any given content interface.

Figure 7:
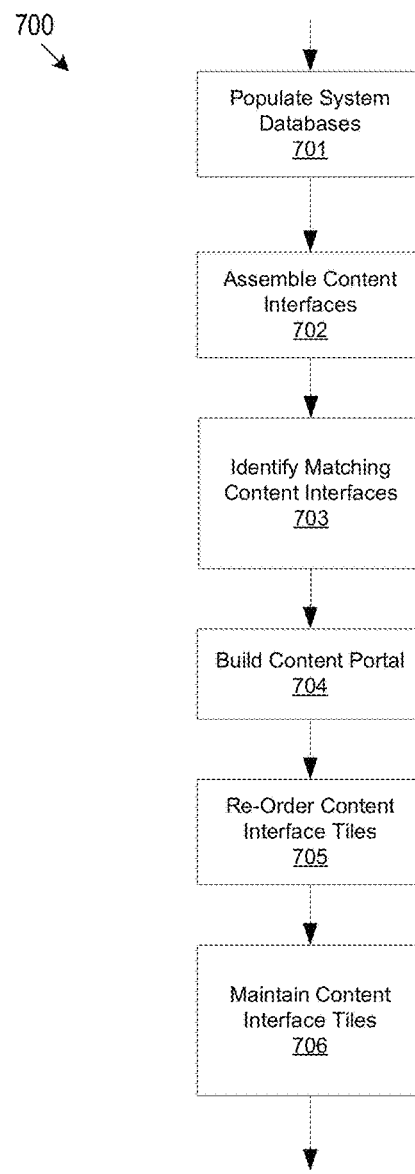
FIG. 7 provides a logical flow for the operation of the on-demand learning system.

FIG. 7 provides example logic 700 that the learning system 100 may implement to provide content interfaces. The logic 700 may populate system databases (701). For instance, the logic 700 may populate the content database 108 with links to internal content assets 119 and external content assets 109 (or with the content assets themselves) that are suggested through the curator input interface, and may also receive from the curator or otherwise obtain or generate content tags 226 for these internal content assets 119 and external content assets 109. The logic 700 may also populate the entity profile database 107, including the human resources database 220. In some instances, the logic 700 may also populate the goal database 600 with content directives 601 or learning plans 602.

The logic 700 may also assemble the content interfaces 225 (702). As described earlier, the content analysis circuitry 201 may generate or assemble a content interface 225 based on information stored in content database 108. In that regard, the logic 700 may, for example, retrieve relevant association information, interaction information, and social integration information from content database 108. The content analysis circuitry 201 may then use this information to generate content interfaces 225, which the communication interface 202 may ultimately present to the content consuming entity 115.

The logic 700 may also identify content interfaces that match the content consuming entity 115 (703). As described earlier, this matching may involve the content analysis circuitry 201 retrieving and comparing user characteristic data from the entity profile database 107 and content tags 226 relating to internal content assets 119 and external content assets 109 from content database 108.

The logic 700 may also build the content portal 230 by linking the matching content interfaces 225 (704), In linking the content interfaces 225, the content analysis circuitry 201 may generate content interface tiles 301a-j corresponding to respective matching content interfaces 225. The communication interface 202 may then arrange the content interface tiles 301a-j in a content portal 230 for presentation to the content consuming entity 115 on display 214. The initial arrangement of the content interface tiles 301a-j may be based on the results of the matching with regards to a corresponding content interface 225. For example, as described earlier, the content analysis circuitry 201 may determine the degree or quality of the match between the user characteristic data of the content consuming entity 115 with the content tags 226.

The logic 700 may re-order the arrangement of the content interface tiles 301a-j for presentation to the content consuming entity 115 (705). This re-ordering may take place, for example, based on certain career goals or based on a learning plan 602 for the content consuming entity 115, The content analysis circuitry 201 may retrieve content directives 601 or learning plans 602 associated with a content consuming entity 115 that may be stored in the goal database 600 goals. The content analysis circuitry 201 may apply the content directives 601 or learning plan 602 to re-order content interface tiles 301a-j, which correspond to matching content interfaces 225. The content analysis circuitry 201, accordingly, may filter or remove certain content interface tiles 301a-j and determine a particular order or hierarchy for other content interface tiles 301a-j. The communication interface 202 may then adjust the placement of content interface tiles 301a-j on content portal 230, for presentation to the content consuming entity 115 on display 214.

The logic 700 may maintain a content portal 230, including adding and removing certain content interface tiles 301a-j based on certain changes in the learning system 100, for example, based on changes in the user characteristic data contained in entity profile database 107 (706). As described above, the content analysis circuitry 201 may determine that there has been a change in the user's role at the organization, in response, the communication interface 202 may un-link one or more content interfaces 225 from a content portal 230, resulting in the removal of one or more corresponding content interface tiles 301a-j from the content portal 230. The communication interface 202 may also render the content portal 230 on display 214 for a content consuming entity 115.

The system 100 may also implement a subject matter expert input interface into the content database. The subject matter expert interface is configured to receive a validation directive from a subject matter expert. When the validation directive is to accept the suggested content asset, then the content building circuitry adds the curator suggested content asset to the available substantive content assets for the content interface. When the validation directive is to reject the curator suggested content asset, then the content building circuitry rejects the suggested content asset without adding the suggested content asset to the available substantive content assets for the content interface.

In addition, the system 100 may receive a publishing directive from the subject matter expert. Responsive to the publishing directive, the system 100 may then mark the substantive content assets as published or unpublished. The system 100 may then build content interfaces using published content assets.

Figure 8:
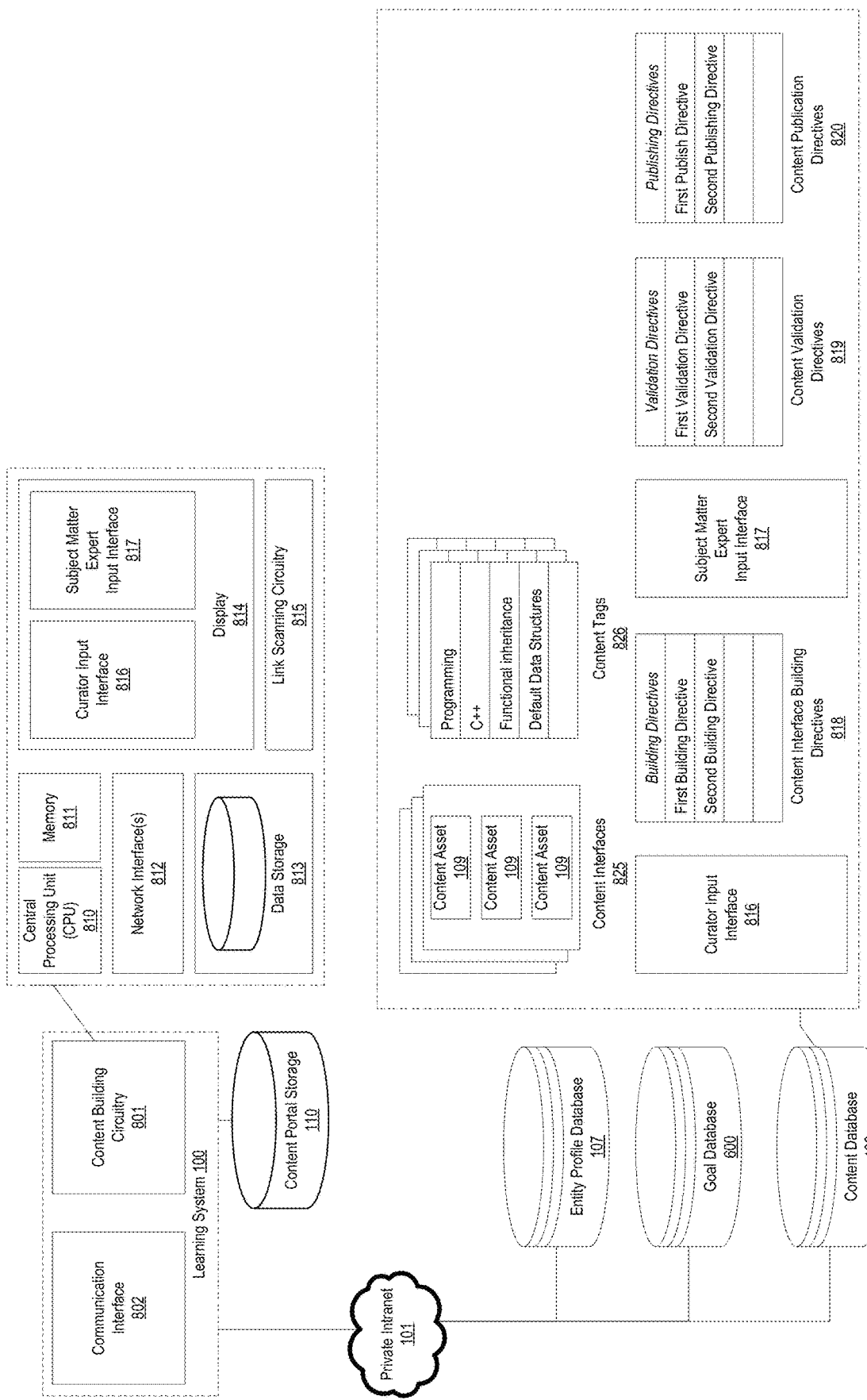
FIG. 8 illustrates a detailed view of an on-demand learning system.

In that regard, and with reference to FIG. 8, the learning system 100 may include a communication interface 802 and content building circuitry 801. In one implementation, the content building circuitry 801 of the learning system 100 further comprises a central processing unit (CPU) 810, a memory 811, one or more network interfaces 812, and a data storage 813, The content building circuitry 801 may also optionally include a display 314 and link scanning circuitry 815. While the display 814 is illustrated as part of the content building circuitry 801, the communication interface 802 may, additionally or alternatively, render a content interface 825 on a remote display 814 (not illustrated), for example on a personal computer or mobile device operated by the content consuming entity 115. The communication interface 202 may provide the ability to remotely view content interfaces 825 over the private Intranet 101 or the public Internet 102 using the network interfaces 812 of the content building circuitry 801.

In one aspect of operation, the communication interface 802, under control of the content building circuitry 801, is configured to communicate with the content database 108. The content database 108 may contain one or more content interfaces 825 that aggregate available internal content assets 119 and external content assets 109 related to a topic specific area. The content database 108 may also contain content tags 826 that characterize the internal content assets 119 and external content assets 109.

As noted above, the content building circuitry 801 may be configured to implement a curator input interface 816 and a subject matter expert input interface 817 in content database 108. The communication interface 802 may present the curator input interface 816 on display 814, which may allow the content asset curators 116 to interact with the curator input interface 816 to generate content interface building directives 818. Similarly, the communication interface 802 may present the subject matter expert input interface 817 on display 814, which may allow subject matter experts 117 to generate content validation directives 819 and publication directives 820.

Figure 9:
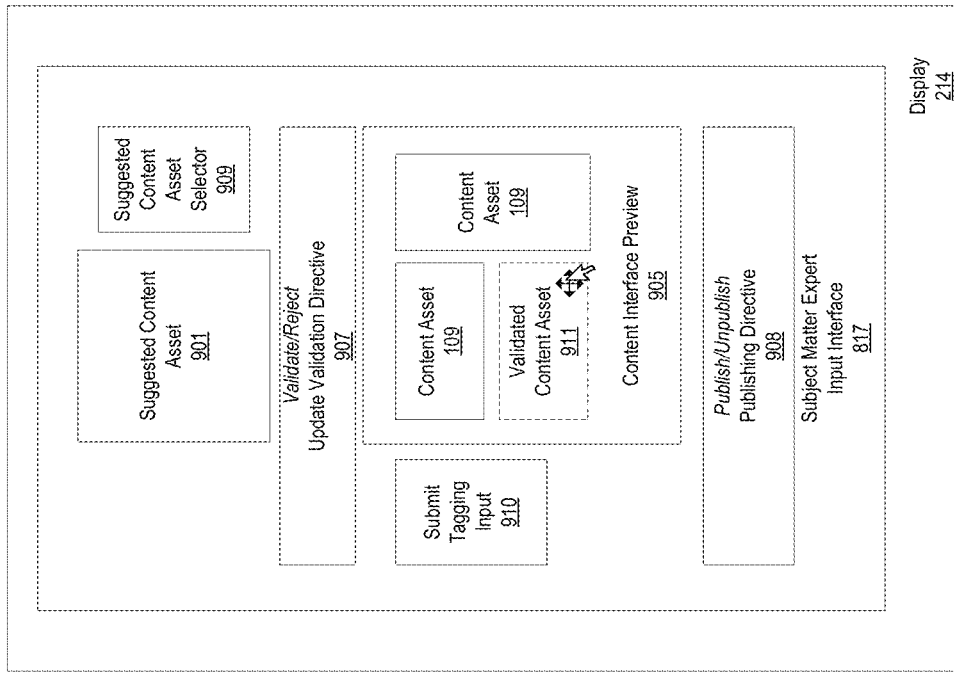
FIG. 9 depicts an exemplary curator input interface and an exemplary subject matter expert input interface.
Figure 9:
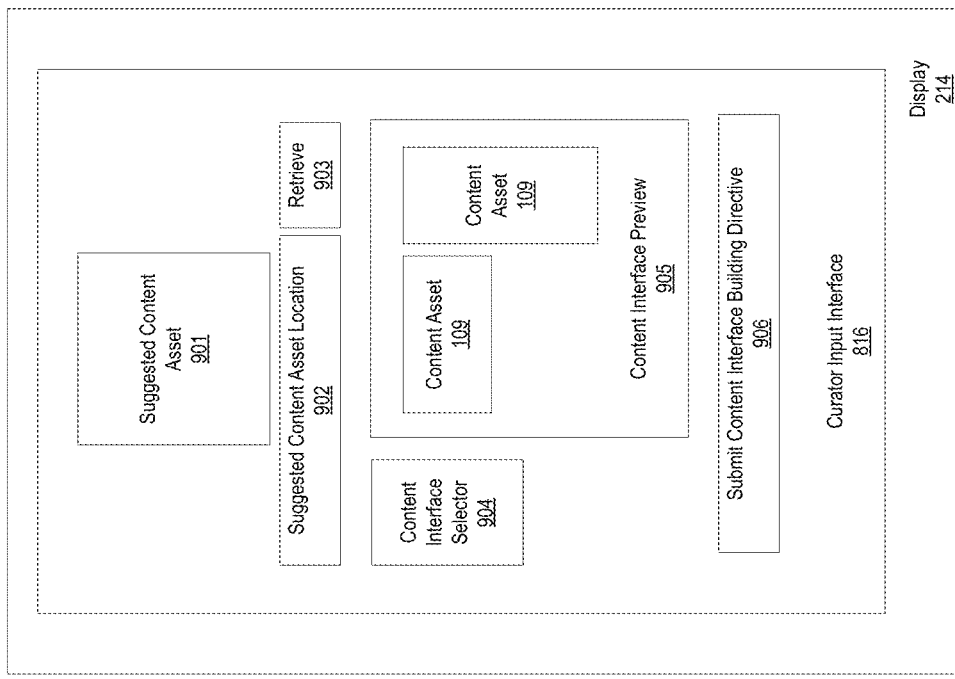

The communication interface 802, through the content building circuitry 801, may for example provide a curator input interface 816 through which a content asset curator 116 may suggest the addition of one or more suggested content assets 901 for a content interface 825. In one implementation, with reference to FIG. 9, the curator input interface 816 may include a suggested content asset location field 902 in which the content asset curator 116 may provide the location of a suggested content asset 901, for example, the reference location, e.g. a URL, of a video clip on YouTube. The curator input interface 816, through the content building circuitry 801, may allow the user to retrieve 903 the suggested content asset 901, which the curator input interface 816 may then render on display 814.

The curator input interface 816 may also include a content interface selector 904, which may allow the content asset curator 116 to select a content interface 825 with which the suggested content asset 901 is to be associated. The curator input interface 816 may communicate the selection of content interface 825 to the content building circuitry 801, which may, in turn, generate a content interface preview 905, The curator input interface 816 may display the content interface preview 905 on display 214 so that the content asset curator 116 may be able to view the content interface 825 and confirm the appropriateness of the suggested content asset 901 for association with the selected content interface 825. The curator input interface 816 may also provide the content asset curator 116 with the option of submitting: a content interface building directive 818 based on the suggested content asset 901 and the selected content interface 825, which the content building circuitry 801 may store in content database 108.

Figure 12:
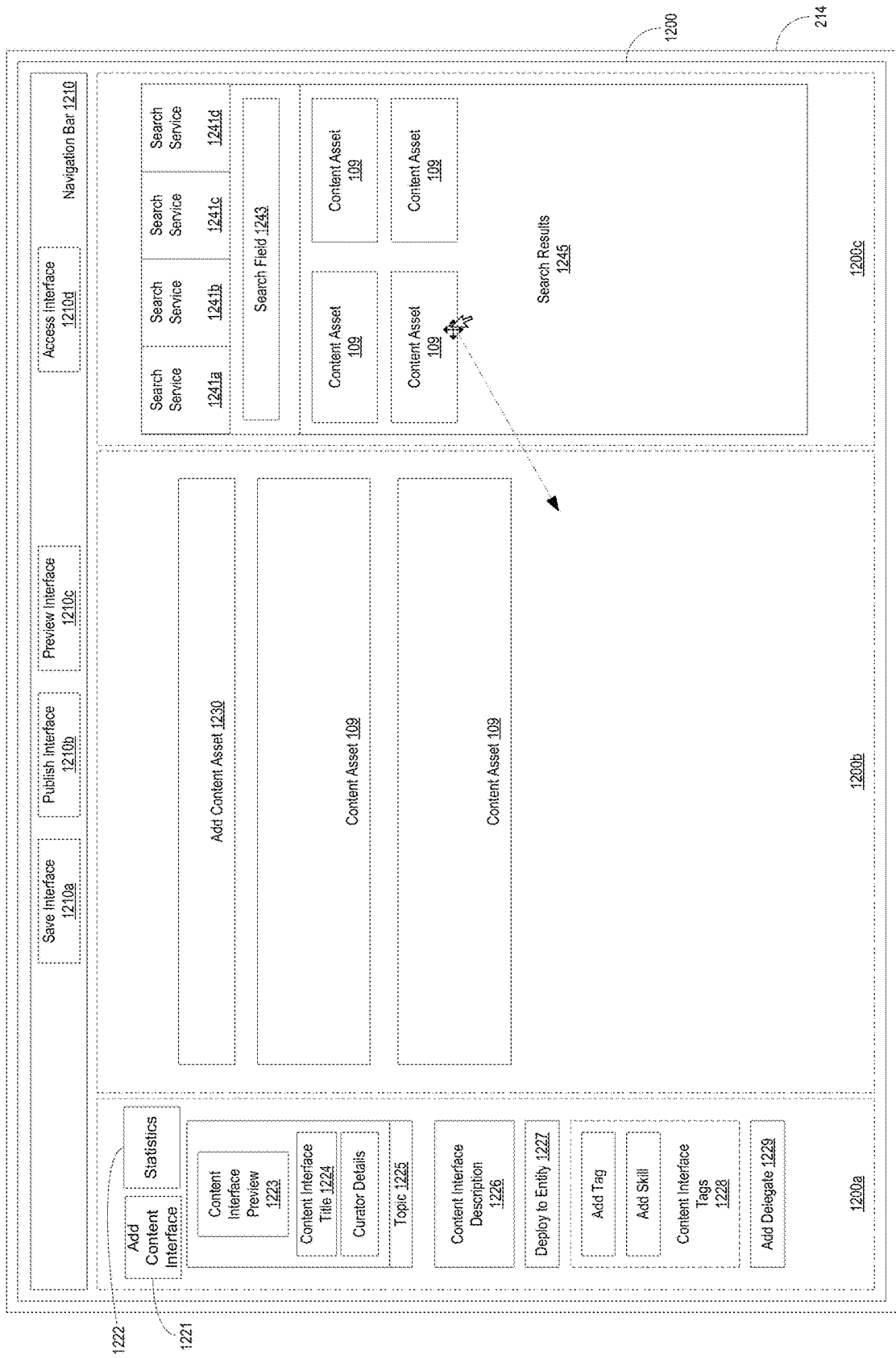
FIG. 12 depicts an exemplary curator input interface.

In another implementation, with reference to FIG. 12, the curator input interface 816 may be extended to provide an integrated curator input interface 1200 The integrated curator input interface 1200, may include a content interface details region 1200a that allows a curator to set the general details of a content interface 225, and a content asset region 1200b that allows a curator to add new internal content assets 119 or external content assets 109 or modify existing internal content assets 119 or external content assets 109. The curator input interface 1200 may also provide an integrated search region 1200c, through which a curator may identify, retrieve, and add internal content assets 119 and external content assets 109 to the content interface 225, and a navigation bar 1210. Through the navigation bar 1210 (i.e., via an access interface GUI element 1210d) a curator may access existing content interfaces 225 that the curator is managing for modification, and save, publish or preview (i.e., via save, publish or preview GUI elements 1210a-c) individual content interfaces 225.

The content interface details region 1200a may provide the curator with the ability to create a new content interface 225 (i.e., via the add content interface GUI element 1221) or modify an existing content interface 225 that the curator has accessed (i.e., via the access interface GUI element 1210d). The curator may also view statistics 1222 regarding the content interfaces 225 that the curator is managing, which for example, may include details like the number of internal content assets 119 and external content assets 109 (identified as published or unpublished) within the content interface 225, the number of endorsements, followers, views, and likes that the content interface 225 has received, and the number of content consuming entities 225 that have completed, or the average level of completion of, the content interface 225. The curator input interface 1200, through the content building circuitry 801, may allow a curator to set the title 1224 and general topic 1225 of the content interface 225, and provide a description 1226 thereof. The curator input interface 1200 may also allow a curator to select an entity 1227 to which the content interface 225 will be deployed (for tracking and reporting purposes), and adjust 1228 content tags 226 that are associated with the content interface 225, e.g., for defining skills and roles. The content building circuitry 801 may generate a preview image or allow a curator to select 1223 a preview image for the content interface 225. A curator may also be able to delegate authority to other curators, who may have similar rights to that of the curator owner, being able to add, edit, or re-arrange internal content assets 119 and external content assets 109 in the content interface 225, but may be limited in their ability to delete an internal content asset 119 or external content asset 109 or content interface 225.

The content asset region 1200b may display internal content assets 119 and external content assets 109 that have been added to the content interface 225, and allow a curator to adjust the order of and manually add 1230 internal content assets 119 and external content assets 109, for example, by providing a heading, description, preview image, and reference location for the internal content assets 119 and external content assets 109, along with content tags 226 for the respective internal content assets 119 and external content assets 109. A curator may also be able to add internal content assets 119 and external content assets 109 using the integrated search region 1200c, which may integrate search services within the curator input interface 1200, for example, using public facing APIs (e.g., YouTube, Google, TedTalks) and private facing APIs (e.g., those of the organization). The integrated search region 1200c may allow a curator to select a particular search service (via search service GUI elements 1241a-d), and may provide a search field 1243 through which a curator may enter search parameters. The content building circuitry 801 may execute the search and return internal content assets 119 and external content assets 109 which may populate the search results region 1245. The internal content assets 119 and external content assets 109 that are returned may be added to the content interface 225 by curators (and delegates), for example, by dragging and dropping the result from the search results region 1245 to the content asset region 1200b of the curator input interface 1200, whereby the content building circuitry 801 may process the internal content asset 119 or external content asset 109 that is selected from the search results region 1245 and link the content asset to the content interface 225.

The communication interface 802, through the content building circuitry 801, may also provide a subject matter expert input interface 817 through which a subject matter expert 117 may validate and publish a suggested content asset 901. In one implementation, with reference to FIG. 9, the content building circuitry 801 may retrieve the content interface building directives 818 from content database 108. The content building circuitry 801 may then generate a list of suggested content assets 901 which the subject matter expert input interface 817 may present to the subject matter expert 117. The subject matter expert 117 may also be provided with a suggested content asset selector 909, which the subject matter expert 117 may use to selectively display a suggested content asset 901 from the generated list of suggested content assets 901. The subject matter expert input interface 817 through the content building circuitry 801 may then retrieve and display the selected suggested content asset 901 for viewing by the subject matter expert 117 on display 214. The content building circuitry 801 may also generate and display a content interface preview 905 based on the content interface 825 associated with the content interface building directive 818, which the subject matter expert input interface 817 may present to the subject matter expert 117 for viewing on display 214.

Validating Suggested Content Assets

The subject matter expert input interface 817 may also provide the subject matter expert 117 with the ability to submit a validation directive 819 regarding a suggested content asset 901, which may reflect the subject matter expert's 117 assessment of the content asset's 901 relevance to the content interface, Prior to evaluation of the suggested content asset 901 by the subject matter expert 117, the suggested content asset 901 may be marked or identified as pending review by the content building circuitry 801, Once a validation directive 819 has been submitted, the content building circuitry 801 may determine whether the validation directive 819 is intended to accept or reject the suggested content asset 901, and where the validation directive 819 indicates acceptance, the content building circuitry 801 may add the suggested content asset 901 to a collection of available content assets for the content interface 825 stored in content database 108. The content building circuitry 801 may add the suggested content assets 901, for example, by creating links to the content assets in the content interface 825. Where the validation directive 819 indicates a rejection, the content building circuitry 801 may mark the suggested content asset 901 as being rejected and may forgo adding the suggested content asset 901 to the content database 108. With respect to suggested content assets 901 that are pending review by subject matter experts 117, the content building circuitry 801 may include or withhold the suggested content asset 901 from the content database 108. Following validation, the content building circuitry 801 may adjust attributes of the suggested content asset 901 and no longer identify the suggested content asset 901 as pending. The validation status of a suggested content asset 901 either pending, validated, or rejected, may be stored in content database 108.

Publishing and Unpublishing Content Assets

In addition to the facilitating the submission of validation directives 819, the subject matter expert input interface 817 may also provide subject matter experts 117 with the ability to submit a publication directive 820, which may indicate a desire to add a validated content asset 911 to an associated content interface 825. The content building circuitry 801, for example, may determine whether the publication directive 820 is intended to publish or unpublish (e.g., remove from accessibility or view) a validated content asset 911, and the content building circuitry 801 may mark the validated content asset 911 accordingly. The publication status of a validated content asset 911 may be stored in content database 108.

The subject matter expert input interface 817, under the control of the content building circuitry 801, may also be configured to maintain a content interface 825. For example, the content building circuitry 801 may retrieve the set of validated content assets 911, and determine whether a validated content asset 911 has been marked for publication or unpublication. Based on this determination, the content building circuitry 801 may be further configured to add those validated content assets 911 marked for publication to the respective content interface 825, while reserving those validated content assets 911 which are marked as unpublished. In instances where a validated content asset 911 has already been published but is marked for unpublication, the content building circuitry 801 may be configured to remove the validated content asset 911 from its respective content interface 825. In adding validated content assets 911 to the respective content interfaces 825, the content building circuitry 801 may provide the validated content asset 911 itself or provide the communication interface 802 with a reference to the location of the validated content asset 911, which may be retrieved from a remote server for rendering. In this way, the communication interface 802 may be seen as a thin layer aggregating various internal content assets 119 and external content assets 109 into a content interface 825.

Content Tagging and Predictive Suggestions

In another aspect of operation, the subject matter expert input interface 817 may provide the subject matter expert 117 with the ability to add additional content tags 226, which serve to characterize the suggested content asset 901. For example, the subject matter expert input interface 817 may provide the subject matter expert 117 with a field for entering and submitting tagging inputs 910. The content building circuitry 801 may interpret these tagging inputs, or tagging directives, and may add a content tag 226 to the content database 108 for a suggested content asset 901. In some instances, the subject matter expert input interface 817, through the content building circuitry 801, may provide additionally functionality with respect the field for entering and submitting tagging inputs 910. For example, the content building circuitry 801 may be configured to suggest or predict appropriate tags in response to previously entered content tags 226 provided in the field for entering and submitting tagging inputs 910. The content building circuitry 801 may be configured to allow the subject matter expert input interface 817 to provide this functionality in real time as the subject matter expert 117 enters a tag into the field for entering and submitting tagging inputs 910. For example, the subject matter expert 117 may want to add the tag "D3 Data Visualization" to a suggested content asset 901. Immediately after entering the character "3", the subject matter expert input interface 817, under control of the content building circuitry 801, may predict or suggest the entire tag, "D3 Data Visualization". The content building circuitry 801 may predict or suggest the content tag 226, for example, based on content tags 226 that have been previously entered.

Identifying and Suspending Inoperable Links

In another aspect of operation, the learning system 100 may further comprise a link scanning circuitry 815, which may serve to identify links to internal content assets 119 and external content assets 109 which are inoperable and which may take certain actions in response. For example, the link scanning circuitry 815 may send a link error message through the curator input interface 802 to a content asset curator 116, who may be associated with or responsible for the content interfaces 825 having the inoperable link. As illustrated in FIG. 8, the link scanning circuitry 815 may be a sub-component of the content budding circuitry 801 in communication with communication interface 802. The link scanning circuitry 815 may be configured to retrieve a set of reference locations associated with one or more internal content assets 119 and external content assets 109 from content database 108. The reference locations; for example, may be in the form of a link, e.g. a URL, or other location data, which the link scanning circuitry 815 may be configured to follow in order to determine if the underlying content asset is operable, if the link scanning circuitry 815 determines that a link is broken, i.e. where the underlying internal content asset 119 or external content asset 109 is inoperable, the link scanning circuitry 815 may suspend the internal content asset 119 or external content asset 109 from those content interfaces 825 in which it appears. The link scanning circuitry 815 may be further configured to alert a content asset curator 116 as to the deficient link. In some instances, where the internal content asset 119 or external content asset 109 is provided by reference, the link scanning circuitry 815 may be configured to notify the content asset curator 116 based on changes in the underlying internal content asset 119 or external content asset 109. For example, the link scanning circuitry 815 may determine a change in certain file attributes, e.g. size, date of creation, last modification, and notify the content asset curator 116 that attention may be warranted. Where a link is found inoperable, the link scanning circuitry 815 may affect the suspension of an inoperable content asset without suspending the content interface 825 as a whole, for example, by marking the internal content asset 119 or external content asset 109 for unpublication. As described above, the content building circuitry 801 may be configured to maintain a content interface 825, which may involve removing a content asset from a content interface 825 upon a determination that the content asset was marked to be unpublished.

Facilitating Content Curation and Subject Matter Expert Validation

Figure 10:
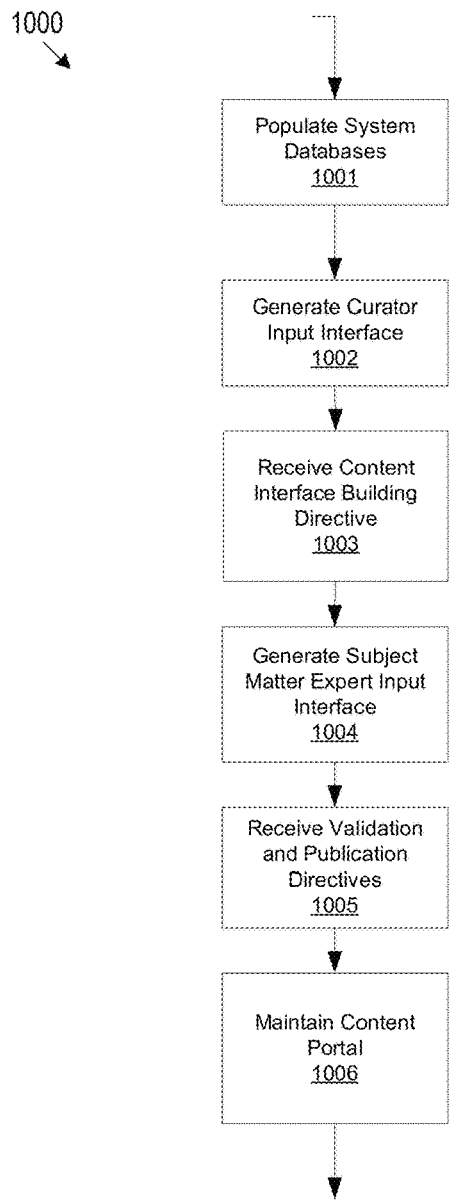
FIG. 10 provides a logical flow for the operation of the on-demand learning system.

FIG. 10 provides example logic 1000, which the learning system 100 may implement to facilitate content curation, e.g., by providing a curator input interface 816 and a subject matter expert input interface 817. The logic 1000 may initialize the learning system 100, which may, for example, include populating the content database 108 with available internal content assets 119 and external content assets 109, content interfaces 825, content tags 226, and content building, validating and publishing directives 820 (1001). The logic 1000 may also generates a curator input interface 816 in content database 108, which the communication interface 802 provides to the content consuming entity 115 for display on display 214 (1002). The logic 1000 may also allow the content asset curator 116 to interact with the communication interface 802 to retrieve a suggested content asset 901 and to specify a content interface 825. The, content asset curator 116 through the curator input interface 816 may submit content interface building directives 818 to be stored in content database 108, which the content building circuitry 801 may mark as pending for review by a subject matter expert 117 (1003).

The logic 1000 may generate a subject matter expert input interface 817, which may include the list of suggested content assets 901 pending review (1004). The subject matter expert 117 may preview the suggested content asset 901 along with the corresponding content interface 825. The logic 1000 may also allow the subject matter expert 117, through the subject matter expert input interlace 817, to provide a validation directive 819, validating or rejecting the suggested content asset 901 (1005). After validation or rejection the suggested content asset 901 may no longer be considered to be pending. In response to a positive validation directive 819, the validated content asset 911 is added with all other internal content assets 119 and external content assets 109 and is available for curation by the subject matter expert 117. Once validated, the subject matter expert 117 may also provide content tags regarding the validated content assets 911.

The logic 1000 may also permit the subject matter expert 117 to issue a publication directive, marking the validated content asset 911 as being in condition for publication (1005). The content building circuitry 801 may introduce or add the validated content assets 911 marked to be published to their respective corresponding content interfaces 825, and may withhold validated content assets 911 that are not marked to be published. The logic 1000 may also maintain content portals 230 by linking the content interfaces 825, containing the validated content assets 911 marked for publishing, to the content portal 230 (1006).

The methods, devices, processing, and logic described above may be implemented in many different ways and in many different combinations of hardware and software. For example, all or parts of the implementations may be circuitry that includes an instruction processor, such as a Central Processing Unit (CPU), microcontroller, or a microprocessor; an Application Specific Integrated Circuit (ASIC), Programmable Logic Device (PLD), or Field Programmable Gate Array (FPGA); or circuitry that includes discrete logic or other circuit components, including analog circuit components, digital circuit components or both; or any combination thereof. The circuitry may include discrete interconnected hardware components and/or may be combined on a single integrated circuit die, distributed among multiple integrated circuit dies, or implemented in a Multiple Chip Module (MCM) of multiple integrated circuit dies in a common package, as examples.

The circuitry may further include or access instructions for execution by the circuitry. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed as circuitry among multiple system components, such as among multiple processors and memories, optionally including multiple distributed processing systems. Parameters, databases, and other data structures may be separately stored and managed, may be incorporated into a single memory or database, may be logically and physically organized in many different ways, and may be implemented in many different ways, including as data structures such as linked lists, hash tables, arrays, records, objects, or implicit storage mechanisms. Programs may be parts (e.g., subroutines) of a single program, separate programs, distributed across several memories and processors, or implemented in many different ways, such as in a library, such as a shared library (e.g., a Dynamic Link Library (DLL)). The DLL, for example, may store instructions that perform any of the processing described above or illustrated in the drawings, when executed by the circuitry.

Various implementations have been specifically described. However, many other implementations are also possible.

What is claimed is:

1. A system comprising:
a communication interface configured to communicate with:
an entity profile database; and
a content database comprising:
individual pre-defined content interfaces that aggregate available substantive content assets into topic specific areas; and
content tags that characterize the substantive content assets; and
content analysis circuitry in communication with the communication interface, the content analysis circuitry configured to:
retrieve, from the entity profile database, entity characteristic data for a content consuming entity and a learning plan;
retrieve, from the content database, the content tags;
compare the entity characteristic data against the content tags to determine a plurality of matching content interfaces among the content interfaces;
generate a personalized content portal for the content consuming entity to display the matching content interfaces in an arrangement in accordance with the learning plan and the content tags, the matching content interfaces linked to the personalized content portal and visually represented in the personalized content portal with content interface tiles generated by the communication interface for each of the matching content interfaces;
filter the matching content interfaces, in response to changes in the entity characteristic data, the learning plan or a combination of both, to direct the communication interface to:
selectively unlink some of the matching content interfaces linked to the personalized content portal in response to the some of the matching content interfaces no longer being a match;
remove content interface tiles corresponding to the some of the matching content interfaces no longer being a match; and
dynamically re-order and adjust a visual arrangement of the content interface tiles remaining in the personalized content portal to present the content interface tiles remaining in the personalized content portal in an order of relevance determined by the content analysis circuitry.

2. The system of claim 1, where the visual arrangement of the content interface tiles are re-ordered and adjusted according to a dynamically determined hierarchy of the matching content interfaces being represented, the hierarchy dynamically determined by the content analysis circuitry based at least in part on usage statistics by a plurality of other content consuming entities of the matching content interfaces linked to the personalized content portal.

3. The system of claim 1, where:
the content analysis circuitry is further configured to:
assign a perceived relevance or importance value to each of the matching content interfaces; and
direct the communication interface to present the visual arrangement of the content interface tiles of the matching content interfaces in an arranged visual order in the personalized content portal based on the perceived relevance or importance values.

4. The system of claim 3, where:
the content analysis circuitry assignment of the perceived relevance value to each of the matching content interfaces, comprises a determination of the perceived relevance based on the learning plan and a degree of matching of the entity characteristic data and the content tags.

5. The system of claim 4, where:
the content analysis circuitry is further configured to adjust an ordering presentation of a content interface tile in the personalized content portal based on a popularity of a corresponding matching content interface with other content consuming entities.

6. The system of claim 1, where:
the entity profile database comprises a human resources database;
the entity characteristic data comprises a user role and a user skill maintained and updated in a user profile for a specific user in the entity profile database; and
where the content analysis circuitry is further configured to adjust linking of matching content interfaces according to changes in the user profile and correspondingly link and unlink content interfaces from the personalized content portal.

7. The system of claim 1, where:
the content analysis circuitry is further configured to adjust a number of matching content interfaces according to changes in the entity characteristic data for the content consuming entity and correspondingly link and unlink content interfaces of the personalized content portal.

8. The system of claim 5, where:
the entity characteristic data further comprises a current proficiency level for the content consuming entity; and
where the content analysis circuitry is further configured to compare the current proficiency level to the content tags to determine the matching content interfaces.

9. The system of claim 1, where the learning plan is representative of a course-like framework for the content consuming entity.

10. The system of claim 1, where the content analysis circuitry is further configured to:
- identify an existing content interface already linked to the personalized content portal;
- determine that the existing content interface no longer matches to the content consuming entity based on an update to the entity characteristic data for the content consuming entity; and
- re-arrange the personalized content portal for the content consuming entity by un-linking the existing content interface from the personalized content portal.

11. The system of claim 10, where:
- the communication interface is further configured to communicate with a goal database;
- where the content analysis circuitry is further configured to:
- retrieve, from the goal database, the learning plan and a content directive applicable to the content consuming entity; and
- adjust the personalized content portal by ordering the multiple matching content interfaces according to the content directive.

12. A system comprising:
- a communication interface configured to communicate with a database comprising:
  - a learning plan;
  - a plurality of content interfaces aggregated into a topic specific area; and
  - content tags that characterize the substantive content assets; and
- content building circuitry in communication with the communication interface, the content building circuitry configured to:
  - implement a curator input interface into the database, the curator input interface configured to:
    - generate a content interface preview to enable modification and save of the content interfaces, enable monitoring of progress of a content consuming entity toward completion of content interfaces associated with the learning plan, and enable specification of a suggested content asset for the content consuming entity;
  - receive content interface building directives through the content interface preview to specify the suggested content asset for a specified content interface;
- content analysis circuitry configured to:
  - associate a content tag for the specified content interface with the suggested content asset;
  - compare entity characteristics of the content consuming entity against the content tags to determine a plurality of matching content interfaces among the content interfaces;
  - generate the content portal for the content consuming entity to display respective content interface tiles generated by the communication interface for each of the matching content interfaces and the specified content interface in an arrangement by selectively linking the matching content interfaces and the specified content interface to the content portal;
  - filter the matching content interfaces and the specified content interface in response to changes in the entity characteristics, the learning plan or a combination of both to direct the communication interface to:
    - selectively and dynamically unlink some of the matching content interfaces linked to the content portal;
    - remove content interface tiles corresponding to unlinked matching content interfaces;
    - re-order and adjust, in accordance with the learning plan, a visual arrangement of respective content interface tiles for each of the matching content interfaces and the specified content interface that are remaining in the content portal; and
  - direct the communication interface to generate and display in the content portal the re-ordered and adjusted visual arrangement of respective content interface tiles for each of the matching content interfaces and the specified content interface such that the content portal is personalized for the content consuming entity.

13. The system of claim 12, where the content building circuitry is further configured to:
- implement a subject matter expert input interface into the database, the subject matter expert interface configured to:
  - receive a validation directive;
  - add the suggested content asset to available substantive content assets for the specified content interface in response to the validation directive being to accept the suggested content asset; and
  - reject the suggested content asset without adding the suggested content asset to the available substantive content assets for the specified content interface in response to the validation directive being to reject the suggested content asset.

14. The system of claim 13, where the content building circuitry is further configured to:
- receive a publishing directive;
- responsive to the publishing directive, mark the substantive content assets as published or unpublished; and
- maintain the content portal for a content consuming entity by:
  - linking the content interface to the content portal for the content consuming entity; and
  - adding to the content interface those substantive content assets marked as published, while reserving those substantive content assets marked as unpublished.

15. The system of claim 12, where the content building circuitry is configured to:
- receive a content interface building directive to add substantive content assets to a content interface by creation of a link to a substantive content asset in the content interface, and the system comprising link scanning circuitry configured to:
- follow the link to the substantive content asset;
- determine that the link is inoperable;
- suspend the particular substantive content asset from the content interface, without suspending the content interface as a whole.

16. The system of claim 15, where the link scanning circuitry is configured to suspend the particular substantive content asset by un-publishing the particular substantive content asset from the content portal.

17. The system of claim 12, where the content building circuitry is further configured to:
- recognize a tagging directive received at the subject matter expert interface;
- add a content tag to the suggested asset in response to the tagging directive;
- store the content tag among the content tags that characterize the substantive content assets.

18. A system comprising:
a communication interface configured to communicate with:
  a entity profile database;
  a goal database storing a learning plan; and
  a content database comprising:
    a plurality of content interfaces, each of the content interfaces aggregating available respective substantive content assets into a respective topic specific area; and
    content tags that respectively characterize corresponding substantive content assets;
content analysis circuitry in communication with the communication interface, the content analysis circuitry configured to:
  retrieve, from the entity profile database, entity characteristics for a content consuming entity;
  retrieve, from the content database, the content tags;
  compare the entity characteristics against the content tags to filter the content interfaces to a set of the corresponding content interfaces that match the entity characteristics;
  link the matching set of the corresponding content interfaces to a content portal for the content consuming entity;
  arrange display of respective content interface tiles generated by the communication interface for each of the corresponding content interfaces in a display order in accordance with the learning plan to:
  filter the matching set of content interfaces in response to changes in the entity characteristics, the learning plan or a combination of both;
  direct the communication interface to selectively and dynamically unlink some of the matching content interfaces linked to the content portal;
  remove content interface tiles corresponding to unlinked matching content interfaces;
  re-order and adjust, in accordance with the learning plan, a visual arrangement of respective content interface tiles for each of the matching content interfaces and the specified content interface that are remaining in the content portal in accordance with an order of relevance determined by the content analysis circuitry.

19. The system of claim 18, where the content analysis circuitry further comprises content filtering circuitry in communication with the communication interface, the content filtering circuitry configured to:
  receive filter criteria applicable to the substantive content assets;
filter the matching set of the corresponding content interfaces using the filter criteria to identify a filtered matching set of the corresponding content interfaces;
  unlink from the content portal those content interfaces in the matching set of the corresponding content interfaces that are not included in filtered matching set of the corresponding content interfaces.

20. The system of claim 19, further comprising:
  content building circuitry in communication with the communication interface, the content building circuitry configured to:
  generate a curator input interface into the content database, the curator input interface configured to:
  receive content interface building directives that specify a suggested content asset to add to one or more of the content interfaces.

* * * * *

UNITED STATES PATENT AND TRADEMARK OFFICE
CERTIFICATE OF CORRECTION

| | | |
|---|---|---|
| PATENT NO. | : 11,238,747 B2 | |
| APPLICATION NO. | : 16/408438 | |
| DATED | : February 1, 2022 | |
| INVENTOR(S) | : Gordon A. Trujillo et al. | |

It is certified that error appears in the above-identified patent and that said Letters Patent is hereby corrected as shown below:

In the Specification

Column 1, Line 26, after "topic", delete "," and insert in its place --.--.

Column 5, Line 4, after "104", delete "," and insert in its place --.--.

Column 8, Line 31, after "108", delete "," and insert in its place --.--.

Column 16, Line 2, after "(704)", delete "," and insert in its place --.--.

Column 16, Line 21, after "115", delete "," and insert in its place --.--.

Column 17, Line 7, after "813", delete "," and insert in its place --.--.

Column 17, Line 61, after "905", delete "," and insert in its place --.--.

Column 19, Line 51, after "interface", delete "," and insert in its place --.--.

Column 19, Line 54, after "801", delete "," and insert in its place --.--.

Column 21, Line 35, delete ", if" and insert in its place --. If--.

Column 16, Lines 42-43, delete ", in" and insert in its place --. In--.

Column 17, Line 8, delete "314" and insert in its place --814--.

Column 20, Line 9, after "901", insert --,--.

Signed and Sealed this
Fifth Day of July, 2022

Katherine Kelly Vidal
*Director of the United States Patent and Trademark Office*

Column 21, Line 26, delete "budding" and insert in its place --building--.

Column 22, Line 23, delete "interlace" and insert in its place --interface--.